(12) United States Patent
Shinogi

(10) Patent No.: US 7,868,709 B2
(45) Date of Patent: Jan. 11, 2011

(54) OSCILLATING CURRENT CONVERTER

(75) Inventor: Masataka Shinogi, Chiba (JP)

(73) Assignee: Seiko Instruments Inc. (JP)

( * ) Notice: Subject to any disclaimer, the term of this patent is extended or adjusted under 35 U.S.C. 154(b) by 87 days.

(21) Appl. No.: 12/315,130

(22) Filed: Nov. 28, 2008

(65) Prior Publication Data

US 2009/0167450 A1    Jul. 2, 2009

(30) Foreign Application Priority Data

Nov. 30, 2007  (JP)  ............................. 2007-311383
Feb. 12, 2008  (JP)  ............................. 2008-030464
Oct. 22, 2008  (JP)  ............................. 2008-272166

(51) Int. Cl.
*H03B 28/00* (2006.01)
*G01P 15/08* (2006.01)
*H01L 41/113* (2006.01)

(52) U.S. Cl. ............... 331/156; 331/116 M; 73/514.21; 73/514.36; 73/774; 310/319; 310/329; 310/339

(58) Field of Classification Search ............. 331/116 M, 331/116 R, 154, 156; 73/514.16, 514.21–514.23, 73/514.29, 514.33, 514.34, 514.36, 514.37, 73/774; 257/254, 415, 417, 418; 310/319, 310/329, 330, 339; 338/2, 5, 13, 43; 438/50, 438/52

See application file for complete search history.

(56) References Cited

U.S. PATENT DOCUMENTS

| | | | | |
|---|---|---|---|---|
| 3,614,677 A | * | 10/1971 | Wilfinger | 333/200 |
| 4,311,968 A | * | 1/1982 | Pickering et al. | 331/90 |
| 4,495,815 A | * | 1/1985 | Stratton et al. | 73/514.19 |
| 4,515,016 A | * | 5/1985 | Hartemann et al. | 73/514.28 |
| 6,158,283 A | * | 12/2000 | Shinogi et al. | 73/514.33 |
| 7,471,033 B2 | * | 12/2008 | Thiesen et al. | 310/339 |
| 7,579,757 B2 | * | 8/2009 | Kulah et al. | 310/339 |

* cited by examiner

*Primary Examiner*—Robert Pascal
*Assistant Examiner*—Levi Gannon
(74) *Attorney, Agent, or Firm*—Adams & Wilks

(57) ABSTRACT

To provide an oscillating current converter fabricated by utilizing the MEMS technology making it possible to further decrease the size yet improving the conversion efficiency.

An oscillating current converter 1 fabricated by using the MEMS technology and comprising a cantilever 4 having an opening 5 formed on the distal end side thereof and is cantilevered on the proximal end side thereof, a coil 6 wound around the opening 5 of the cantilever 4, and a magnet 8 arranged so as to enter into the inside of the opening 5 of the cantilever 4, wherein the cantilever 4 oscillates to generate an induced electromotive force in the coil 6.

12 Claims, 12 Drawing Sheets

OSCILLATING CURRENT CONVERTER

FIELD OF THE INVENTION

This invention relates to an oscillating current converter fabricated by using a micro electro mechanical systems (MEMS) technology.

BACKGROUND INFORMATION

In recent years, a so-called MEMS technology has been developed for fabricating highly functional devices such as sensors and actuators in μ-sizes by utilizing a high precision three-dimensional machining technology based on semiconductor production technology. By utilizing the MEMS technology, further, there has also been proposed a very small oscillating current converter capable of taking out an electric current by converting oscillation occurring on a cantilever into electric energy (see, for example, patent document 1 and non-patent document 1).

Of them, the following non-patent document 1 discloses an oscillating current converter 300 as shown in FIG. 21. The oscillating current converter 300 includes a plurality of cantilevers 302 cantilevered via a support portion 301, coils 303 formed on the surfaces of the cantilevers 302, and a magnet 304 arranged near the cantilevers 302. The oscillating current converter 300 has the cantilevers 302 which are arranged in the same direction and in parallel with each other having lengths that are successively differing so that the cantilevers 302 oscillate at different natural frequencies. In the oscillating current converter 300, the cantilevers 302 oscillate so as to generate induced electromotive forces in the coils 303.

According to the oscillating current converter 300 disclosed in the non-patent document 1, however, the distance is not the same between the cantilevers 302 and the magnet 304 arousing such a problem that a difference occurs in the electromotive force produced in the coils 303 arranged on the cantilevers 302. The oscillating current converter 300 further has a problem in that the device as a whole becomes bulky depending upon the size of the magnet 304.

In order for the oscillating current converter 300 to produce a large electromotive force, further, it can be contrived to increase a change in the magnetic flux by, for example, increasing the natural frequencies and amplitudes of the cantilevers 302. With the conventional oscillating current converter 300, however, it is difficult to increase the amplitudes of the cantilevers 302. If, for example, the lengths of the cantilevers 302 are increased to increase the amplitudes of the cantilevers 302, then the device becomes bulky as described above.

[Patent document 1] JP-A-7-107752
[Non-patent document 1] Ibrahim Sari, Tuna Balkan and Haluk Kulah, "A WIDEBAND ELECTROMAGNETIC MICRO POWER GENERATOR FOR WIRELESS MICROSYSTEMS", Transducer & EUROSENSORS '07, p. 275-278

SUMMARY OF THE INVENTIONS

The present invention was proposed in view of the above conventional circumstances, and has an object of providing an oscillating current converter fabricated by utilizing the MEMS technology making it possible to further decrease the size yet improving the conversion efficiency.

In order to achieve the above object, the oscillating current converter according to the invention is fabricated by using the MEMS technology and comprises a cantilever having an opening formed on the distal end side thereof and is cantilevered on the proximal end side thereof, a coil wound around the opening of the cantilever, and a magnet arranged so as to enter into the inside of the opening of the cantilever, wherein the cantilever oscillates to generate an induced electromotive force in the coil.

In this oscillating current converter, the coil is arranged around the opening of the cantilever and the magnet is arranged so as to enter into the inside of the opening of the cantilever. Accompanying the oscillation of the cantilever, therefore, the magnet that is capable of entering into the inside of the coil undergoes a relative motion in the axial direction of the coil. This greatly varies the magnetic flux of the magnet piercing through the coil and makes it possible to generate a large induced electromotive force in the coil. Therefore, the oscillating current converter enables the oscillation occurring on the cantilever to be efficiently converted into an electric current. Moreover, with the magnet being arranged so as to enter into the inside of the opening of the cantilever, the size of the device can be decreased.

Another oscillating current converter according to the invention is fabricated by using the MEMS technology and comprises a first cantilever having an opening formed on the distal end side thereof and is cantilevered on the proximal end side thereof, a second cantilever arranged facing the first cantilever and is cantilevered on the proximal end side thereof, a coil wound around the opening of the first cantilever, and a magnet provided on the distal end side of the second cantilever so as to enter into the inside of the opening of the first cantilever, wherein one or both of the first cantilever and the second cantilever oscillate to generate an induced electromotive force in the coil.

In this oscillating current converter, the coil is arranged around the opening of the first cantilever between the first cantilever and the second cantilever arranged facing each other, and the magnet is arranged on the distal end side of the second cantilever so as to enter into the inside of the opening of the first cantilever. Accompanying the oscillation of at least one or both of the first cantilever and the second cantilever, therefore, the magnet that is capable of entering into the inside of the coil undergoes a relative motion in the axial direction of the coil. This greatly varies the magnetic flux of the magnet piercing through the coil and makes it possible to generate a large induced electromotive force in the coil. Therefore, the oscillating current converter enables the oscillation occurring on the first cantilever and on the second cantilever to be efficiently converted into an electric current. Moreover, with the magnet being provided on the distal end side of the second cantilever so as to enter into the inside of the opening of the first cantilever, the size of the device can be decreased.

A further oscillating current converter according to the invention is fabricated by using the MEMS technology and comprises a first cantilever having an opening formed on the distal end side thereof and is cantilevered on the proximal end side thereof, a second cantilever arranged facing the first cantilever, having an opening formed on the distal end side thereof and being cantilevered on the proximal end side thereof, a first coil wound around the opening of the first cantilever, a second coil wound around the opening of the second cantilever, and a magnet arranged so as to enter into the inside of the openings of the first and second cantilevers, wherein the first and second cantilevers oscillate to generate induced electromotive forces in the first and second coils.

In this oscillating current converter, the first and second coils are arranged around the openings of the first and second cantilevers arranged facing each other, and the magnet is arranged so as to enter into the inside of the openings of the first and second cantilevers. Accompanying the oscillation of the first and second cantilevers, therefore, the magnet that is capable of entering into the inside of the first and second coils undergoes a relative motion in the axial direction of the first and second coils. This greatly varies the magnetic flux of the magnet piercing through the first and second coils and makes it possible to generate large induced electromotive forces in the first and second coils. Therefore, the oscillating current converter enables the oscillation occurring on the first cantilever and on the second cantilever to be efficiently converted into an electric current. With the magnet being arranged so as to enter into the inside of the openings of the first and second cantilevers, further, the size of the device can be decreased.

It is further desired that the first cantilever and the second cantilever are arranged in the same direction in parallel and facing each other, and are formed integrally with a support portion.

In this case, the oscillating current converter can be formed in an integrated form.

A further oscillating current converter according to the invention is fabricated by using the MEMS technology and comprises a plurality of converter cells arranged maintaining a predetermined distance, the converter cells having an opening formed on the distal end side thereof, a cantilever cantilevered on the proximal end side thereof, a coil wound around the opening of the cantilever, and a magnet arranged so as to enter into the inside of the opening of the cantilever, wherein the cantilever oscillates to generate an induced electromotive force in the coil.

In this oscillating current converter, the coil is arranged around the opening of the cantilever of each of the converter cells, and the magnet is arranged so as to enter into the inside of the opening of the cantilever. Accompanying the oscillation of the cantilevers, therefore, the magnet that is capable of entering into the inside of the coil undergoes a relative motion in the axial direction of the coil. This greatly varies the magnetic flux of the magnet piercing through the coils of the converter cells and makes it possible to generate large induced electromotive forces in the coils. Therefore, the oscillating current converter enables the oscillation occurring on the cantilevers of the converter cells to be efficiently converted into an electric current. Further, the oscillating current converter is provided with the plurality of converter cells and is capable of producing a large electromotive force. In this oscillating current converter, further, the magnets are arranged so as to enter into the inside of the openings of the cantilevers of the converter cells, and the size of the device can be decreased.

A further oscillating current converter according to the invention is fabricated by using the MEMS technology and comprises a plurality of converter cells arranged maintaining a predetermined distance, the converter cells having an opening formed on the distal end side thereof, a first cantilever cantilevered on the proximal end side thereof, a second cantilever arranged facing the first cantilever and is cantilevered on the proximal end side thereof, a coil wound around the opening of the first cantilever, and a magnet provided on the distal end side of the second cantilever so as to enter into the inside of the opening of the first cantilever, wherein at least one or both of the first cantilever and the second cantilever oscillate to generate an induced electromotive force in the coil.

In this oscillating current converter, the coil is arranged around the opening of the first cantilever between the first cantilever and the second cantilever arranged facing each other in each converter cell, and the magnet is arranged on the distal end side of the second cantilever so as to enter into the inside of the opening of the first cantilever. Accompanying the oscillation of at least one or both of the first cantilever and the second cantilever, therefore, the magnet that is capable of entering into the inside of the coil undergoes a relative motion in the axial direction of the coil. This greatly varies the magnetic flux of the magnet piercing through the coils of the converter cells and makes it possible to generate large induced electromotive forces in the coils. Therefore, the oscillating current converter enables the oscillation occurring on the first cantilever and on the second cantilever of the converter cells to be efficiently converted into an electric current. Further, the oscillating current converter is provided with the plurality of converter cells and is capable to producing a large electromotive force. In this oscillating current converter, further, the magnet provided on the distal end side of the second cantilever of the converter cell is arranged so as to enter into the inside of the opening of the first cantilever, and the size of the device can be decreased.

A further oscillating current converter according to the invention is fabricated by using the MEMS technology and comprises a plurality of converter cells arranged maintaining a predetermined distance, the converter cells having an opening formed on the distal end side thereof, a first cantilever cantilevered on the proximal end side thereof, a second cantilever arranged facing the first cantilever, having an opening formed on the distal end side thereof and being cantilevered on the proximal end side thereof, a first coil wound around the opening of the first cantilever, a second coil wound around the opening of the second cantilever, and a magnet arranged so as to enter into the inside of the openings of the first and second cantilevers, wherein the first and second cantilevers oscillate to generate induced electromotive forces in the first and second coils.

In this oscillating current converter, the first and second coils are arranged around the openings of the first and second cantilevers arranged facing each other in each converter cell, and the magnet is arranged so as to enter into the inside of the openings of the first and second cantilevers. Accompanying the oscillation of the first and second cantilevers of the converter cells, therefore, the magnet that is capable of entering into the inside of the first and second coils undergoes a relative motion in the axial direction of the first and second coils. This greatly varies the magnetic flux of the magnet piercing through the first and second coils of the converter cells and makes it possible to generate large induced electromotive forces in the first and second coils. Therefore, the oscillating current converter enables the oscillation occurring on the first cantilever and on the second cantilever of the converter cells to be efficiently converted into an electric current. Further, the oscillating current converter is provided with the plurality of converter cells and is capable to producing a large electromotive force. In this oscillating current converter, further, the magnet is arranged so as to enter into the inside of the openings of the first and second cantilevers, and the size of the device can be decreased.

It is further desired that the cantilevers constituting the plurality of converter cells are arranged in the same direction in parallel and facing each other, and are formed integrally with a support portion that cantilevers the proximal end sides thereof.

In this case, the oscillating current converter can be formed in an integrated form.

Further, the first cantilever and the second cantilever may be arranged in the same direction in parallel and facing each other, and may be formed integrally with the support portion via a coupling portion that couples the proximal end sides thereof.

In this case, the first cantilever and the second cantilever are coupled together via the coupling portion to become of the type of so-called tuning fork. Namely, the first cantilever and the second cantilever undergo a large oscillation resonating with each other. Therefore, this constitution makes it possible to obtain a large electromotive force.

In the above oscillating current converter, the coils may be arranged on both surfaces of the cantilever.

In this case, a large induced electromotive force generates in the coils arranged on both surfaces of the cantilever.

In the above oscillating current converter, further, a weight may be arranged on the distal end side of the cantilever.

In this case, a large electromotive force can be obtained by increasing the amplitude of the cantilever. By changing the weight, further, a wide range of frequencies can be coped with.

A further oscillating current converter according to the invention is fabricated by using the MEMS technology and comprises a base, an oscillator attached to the surface of the base via a spring, a coil arranged on the surface of the oscillator, and a magnet arranged on the surface of the base, wherein the oscillator oscillates to generate an induced electromotive force in the coil.

In this oscillating current converter, the oscillator attached to the surface of the base via the spring oscillates. Therefore, the oscillator oscillates maintaining a large amplitude. Besides, the oscillation attenuates slowly and the oscillator continues to oscillate for an extended period of time. Therefore, the distance the magnet relatively moves in the axial direction of the coil undergoes a large change, and the magnetic flux of the magnet piercing through the coil undergoes a large change, too, making it possible to generate a large induced electromotive force in the coil as well as to generate the induced electromotive force for an extended period of time. Therefore, the oscillating current converter enables the oscillation occurring on the oscillator to be efficiently converted into an electric current.

A further oscillating current converter according to the invention is fabricated by using the MEMS technology and comprises a base, a first oscillator attached to the surface of the base via a spring, a second oscillator arranged facing the first oscillator and is attached to the surface of the base via a spring, a first coil arranged on the surface of the first oscillator, a second coil arranged on the surface of the second oscillator, and a magnet arranged on the surface of the base, wherein the first and second oscillators oscillate to generate induced electromotive forces in the first and second coils.

In this oscillating current converter, the first oscillator attached to the surface of the base via the spring oscillates together with the second oscillator that is arranged facing the first oscillator and is attached to the surface of the base via the spring. Therefore, the first and second oscillators oscillate maintaining a large amplitude. Besides, the oscillation attenuates slowly and the first and second oscillators continue to oscillate for an extended period of time. Therefore, the distance the magnet relatively moves in the axial direction of the first and second coils undergoes a large change, and the magnetic flux of the magnet piercing through the first and second coils undergoes a large change, too, making it possible to generate a large induced electromotive force in the first and second coils as well as to generate the induced electromotive force for an extended period of time. Therefore, the oscillating current converter enables the oscillation occurring on the oscillators to be efficiently converted into an electric current.

A further oscillating current converter according to the invention is fabricated by using the MEMS technology and comprises a plurality of converter cells arranged maintaining a predetermined distance, the converter cells having a base, an oscillator attached to the surface of the base via a spring, a coil arranged on the surface of the oscillator, and a magnet arranged on the surface of the base, wherein the oscillator oscillates to generate an induced electromotive force in the coil.

In this oscillating current converter, the oscillator attached to the surface of the base via the spring undergoes the oscillation in each of the converter cells. Therefore, the oscillators oscillate maintaining a large amplitude. Besides, the oscillation attenuates slowly and the oscillators continue to oscillate for an extended period of time. Therefore, the distance the magnet relatively moves in the axial direction of the coil of the converter cells undergoes a large change, and the magnetic flux of the magnet piercing through the coils undergoes a large change, too, making it possible to generate a large induced electromotive force in the coils as well as to generate the induced electromotive force for an extended period of time. Therefore, the oscillating current converter enables the oscillation occurring on the oscillators of the converter cells to be efficiently converted into an electric current. Further, the oscillating current converter is provided with the plurality of converter cells and is capable to producing a large electromotive force.

A further oscillating current converter according to the invention is fabricated by using the MEMS technology and comprises a plurality of converter cells arranged maintaining a predetermined distance, the converter cells having a base, a first oscillator attached to the surface of the base via a spring, a second oscillator arranged facing the first oscillator and is attached to the surface of the base via a spring, a first coil arranged on the surface of the first oscillator, a second coil arranged on the surface of the second oscillator, and a magnet arranged on the surface of the base, wherein the first and second oscillators oscillate to generate induced electromotive forces in the first and second coils.

In this oscillating current converter, the first oscillator attached to the surface of the base via the spring oscillates together with the second oscillator arranged facing the first oscillator and is attached to the surface of the base via the spring in each of the converter cells. Therefore, the first and second oscillators oscillate maintaining a large amplitude. Besides, the oscillation attenuates slowly and the first and second oscillators continue to oscillate for an extended period of time. Therefore, the distance the magnet relatively moves in the axial direction of the first and second coils of the converter cells undergoes a large change, and the magnetic flux of the magnet piercing through the first and second coils undergoes a large change, too, making it possible to generate a large induced electromotive force in the first and second coils as well as to generate the induced electromotive force for an extended period of time. Therefore, the oscillating current converter enables the oscillation occurring on the oscillators of the converter cells to be efficiently converted into an electric current. Further, the oscillating current converter is provided with the plurality of converter cells and is capable of producing a large electromotive force.

It is desired that the oscillators are supported in a state of being cantilevered or supported at both ends thereof via springs.

In this case, the oscillators oscillate maintaining a large amplitude. Besides, the oscillation attenuates slowly and the oscillators continue to oscillate for an extended period of time. In particular, the oscillators supported at both ends on the surfaces of the bases via springs exhibit more stable oscillation characteristics than those of the oscillators that are cantilevered, and feature improved frequency.

It is further desired that the coil is arranged being wound around the opening formed in the oscillator, and the magnet is arranged so as to enter into the inside of the opening of the oscillator.

In this case, accompanying the oscillation of the oscillator, therefore, the magnet that is capable of entering into the inside of the coils undergoes a relative motion in the axial direction of the coils. This greatly varies the magnetic flux of the magnet piercing through the coils and makes it possible to generate large induced electromotive forces in the coils. Further, the magnet is arranged so as to enter into the inside of the openings of the oscillator, and the size of the device can be decreased.

A further oscillating current converter according to the invention is fabricated by using the MEMS technology and comprises a base, an oscillator attached to the surface of the base via a spring and has an opening, a core arranged on the surface of the base so as to enter into the inside of the opening of the oscillator, and a coil wound around the core, wherein the oscillator includes a magnet, and the oscillator including the magnet oscillates to generate an induced electromotive force in the coil.

In this oscillating current converter, the oscillator attached to the surface of the base via the spring includes the magnet, and the coil wound around the core is arranged so as to enter into the inside of the opening of the oscillator. Therefore, the oscillator oscillates maintaining a large amplitude. Besides, the oscillation attenuates slowly and the oscillator continues to oscillate for an extended period of time. Therefore, the distance greatly varies over which the core relatively moves in the axial direction so as to enter into the inside of the opening of the oscillator, and the magnetic flux of the magnet piercing through the coil wound around the core undergoes a large change, too, making it possible to generate a large induced electromotive force in the coil as well as to generate the induced electromotive force for an extended period of time. Therefore, the oscillating current converter enables the oscillation occurring on the oscillator to be efficiently converted into an electric current. Further, the coil wound around the core is arranged so as to enter into the inside of the opening of the oscillator, and the size of the device can be decreased.

A further oscillating current converter according to the invention is fabricated by using the MEMS technology and comprises a plurality of converter cells arranged maintaining a predetermined distance, the converter cells having a base, an oscillator attached to the surface of the base via a spring and having an opening, a core arranged on the surface of the base so as to enter into the inside of the opening of the oscillator, and a coil wound around the core, wherein the oscillator includes a magnet, and the oscillator including the magnet oscillates to generate an induced electromotive force in the coil.

In this oscillating current converter, the oscillator attached to the surface of the base via the spring includes the magnet in each of the converter cells, and the coil wound around the core is arranged so as to enter into the inside of the opening of the oscillator. Therefore, the oscillators oscillate maintaining a large amplitude. Besides, the oscillation attenuates slowly and the oscillators continue to oscillate for an extended period of time. Therefore, the distance greatly varies over which the core relatively moves in the axial direction so as to enter into the inside of the opening of the oscillator, and the magnetic flux of the magnet piercing through the coil wound around the core undergoes a large change, too, making it possible to generate a large induced electromotive force in the coil as well as to generate the induced electromotive force for an extended period of time. Therefore, the oscillating current converter enables the oscillation occurring on the oscillators of the converter cells to be efficiently converted into an electric current. Further, the oscillating current converter is provided with the plurality of converter cells and is capable to producing a large electromotive force. In the oscillating current converter, further, the coil wound around the core is arranged so as to enter into the inside of the opening of the oscillator of the converter cells, and the size of the device can be decreased.

It is, further, desired that the plurality of converter cells have different natural frequencies.

In this case, the oscillating current converter is allowed to cope with a wide range of frequencies, and in which any one of the cantilevers or oscillators of the converter cells having different natural frequencies resonates; i.e., the cantilever or the oscillator oscillates efficiently, and the oscillation can be efficiently converted into an electric current.

According to the present invention as described above, the oscillating current converter fabricated by utilizing the MEMS technology features a further decreased size and an improved conversion efficiency.

DETAILED DESCRIPTION OF THE PREFERRED EMBODIMENTS

The oscillating current converter to which the present invention is applied will now be described in detail with reference to the drawings. In the drawings used for the explanation, characteristic portions are often illustrated on an exaggerated scale for easy comprehension, and the dimensional ratios of the constituent elements are not necessarily the same as the real ones.

First Embodiment

First, described below with reference to FIG. 1 is an oscillating current converter 1 according to a first embodiment.

Referring to FIG. 1, the oscillating current converter 1 is a very small generator module fabricated in µ-sizes by utilizing a high precision three-dimensional machining technology called MEMS (micro electro mechanical systems) technology based on a semiconductor production technology or a laser machining technology. Here, the MEMS stands for a very small electro mechanical system merging mechanical parts and electronic circuitry together on a chip.

Concretely, the oscillating current converter 1 includes a base 2, a support portion 3 formed rising from one end of the base 2, and a cantilever 4 cantilevered by the support portion 3.

Among them, the base 2 is made from silicon of the shape of, for example, a rectangular flat plate. The support portion 3 is formed integrally with the base 2, and is rising nearly at right angles with the main surface of the base 2. The cantilever 4 is an elongated resilient support piece, is arranged facing the main surface of the base 2, and is formed integrally with the support portion 3. Further, the cantilever 4 is cantilevered on the proximal end side thereof at the upper end of the support portion 3, and oscillates on the distal end side thereof in a direction in which it approaches, or separates away from, the main surface of the base 2.

An opening 5 is formed in the cantilever 4 on the distal end side thereof. The opening 5 is for permitting a magnet 8 that will be described later to enter into the inside thereof, and is formed by a hole that penetrates through the cantilever 4. The opening 5 in FIG. 1 is of a circular shape but is not necessarily limited to this shape only and may be, for example, of an elliptic shape or a rectangular shape.

A coil 6 is provided on the upper surface of the cantilever 4 being wound around the opening 5. The coil 6 is made from an electrically conducting thin metal film such as of nickel, copper or gold, and is formed as a pattern on the cantilever 4 by using a photolithography technology or the like technology. Concretely, the coil 6 includes a coil pattern 6a spirally wound about the opening 5, a draw wiring 6b drawn from an end on the inner circumferential side of the coil pattern 6a toward the proximal end side of the cantilever 4 being insulated from the coil pattern 6a, and a draw wiring 6c drawn from an end on the outer circumferential side of the coil pattern 6a toward the proximal end side of the cantilever 4. The draw wirings 6b and 6c on the inner side and the outer side are electrically connected to a power source circuit 7 provided on the upper surface of the support portion 3. The power source circuit 7 rectifies and smoothes an electric current flowing into the coil 6, and converts the alternating current into a direct current to output it.

A magnet 8 is provided on the main surface of the base 2. The magnet 8 is obtained by, for example, dispersing a magnetic powder of samarium cobalt in a polydimethylsiloxane (PDMS). Further, the magnet 8 is provided protruding like a pole upward from the main surface of the base 2 so as to enter into the inside of the opening 5 of the cantilever 4, and is magnetized into N-pole and S-pole in the up-and-down direction. In FIG. 1, the magnet 8 is in the shape of a pole but is not necessarily limited thereto only and may, for example, be of a square pole shape or the like shape if it can enter into the inside of the opening 5.

In the oscillating current converter 1 having the above structure, the cantilever 4 oscillates to generate an induced electromotive force in the coil 6. That is, in the oscillating current converter 1, the cantilever 4 oscillates so that the magnet 8 capable of entering into the inside of the coil 6 undergoes a relative motion in the axial direction of the coil 6. In this case, the magnetic flux of the magnet 8 piercing through the coil 6 greatly varies, and a large induced electromotive force generates in the coil 6.

According to the oscillating current converter 1 to which the invention is applied as described above, oscillation occurring on the cantilever 4 can be efficiently converted into an electric current (electric power). Moreover, upon arranging the magnet 8 so as to enter into the inside of the opening 5 of the cantilever 4, the size of the device can be decreased. According to the invention, therefore, the oscillating current converter 1 fabricated by using the MEMS technology features a further decreased size and improved conversion efficiency (generation efficiency).

Second Embodiment

Next, described below with reference to FIG. 2 is an oscillating current converter 20 according to a second embodiment.

Like the above oscillating current converter 1, the oscillating current converter 20 is a very small generator module fabricated in μ-sizes by utilizing the high precision three-dimensional machining technology called MEMS (micro electro mechanical systems) technology based on the semiconductor production technology or the laser machining technology, and has a structure provided with a plurality of converter cells (generator cells) 21, each cell 21 comprising the above oscillating current converter 1.

Concretely, the oscillating current converter 20 includes a base 22, a support portion 23 formed rising from one end of the base 22, and a plurality of cantilever 24 cantilevered by the support portion 23.

Among them, the base 22 is made from silicon of the shape of, for example, a rectangular flat plate. The support portion 23 is formed integrally with the base 22, and is rising nearly at right angles with the main surface of the base 22. The plurality of cantilevers 24 are elongated resilient support pieces, are arranged facing the main surface of the base 2, and are formed integrally with the support portion 23. Further, the plurality of cantilevers 24 are cantilevered on the proximal end side thereof at the upper end of the support portion 23, and oscillate on the distal end side thereof in a direction in which they approach, or separate away from, the main surface of the base 22. Further, the plurality of cantilevers 24 are arranged in parallel maintaining a predetermined distance in a direction at right angles with the cantilevers 24, and have lengths that are successively differed to differ their natural frequencies.

An opening 25 is formed in each cantilever 24 on the distal end side thereof. The opening 25 is for permitting a magnet 28 that will be described later to enter into the inside thereof, and is formed by a hole that penetrates through the cantilever 24. The opening 25 in FIG. 2 is of a circular shape but is not necessarily limited to this shape only and may be, for example, of an elliptic shape or a rectangular shape.

A coil 26 is provided on the upper surface of the cantilever 24 being wound around the opening 25. The coil 26 is made from an electrically conducting thin metal film such as of nickel, copper or gold, and is formed as a pattern on the cantilever 24 by using the photolithography technology or the like technology. Concretely, the coil 26 includes a coil pattern 26a spirally wound about the opening 25, a draw wiring 26b drawn from an end on the inner circumferential side of the coil pattern 26a toward the proximal end side of the cantilever 24 being insulated from the coil pattern 26a, and a draw wiring 26c drawn from an end on the outer circumferential side of the coil pattern 26a toward the proximal end side of the cantilever 24.

The coils 26 provided on the upper surfaces of the cantilevers 24 have their draw wirings 6b on the inner side and draw wirings 6c on the outer side neighboring each other electrically connected to a power source circuit 27 provided on the upper surface of the support portion 3. The power source circuit 27 rectifies and smoothes an electric current flowing into the coils 26, and converts the alternating current into a direct current to output it.

A plurality of magnets 28 are provided on the main surface of the base 2. These magnets 8 are obtained by, for example, dispersing a magnetic powder of samarium cobalt in a polydimethylsiloxane (PDMS). Further, the magnets 28 are provided protruding like poles upward from the main surface of the base 2 so as to enter into the inside of the openings 5 of the cantilevers 4, and are magnetized into N-pole and S-pole in the up-and-down direction. In FIG. 2, the magnets 8 are in the shape of poles but are not necessarily limited thereto only and may, for example, be of a square pole shape or the like shape if they can enter into the inside of the openings 5.

This oscillating current converter 20 is constituted like the above oscillating current converter 1, and in which each converter cell 21 is constituted by the cantilever 24 having the opening 25 on the distal end side thereof and is cantilevered on the proximal end side thereof, the coil 26 wound around the opening 25 of the cantilever 24, and the magnet 28 arranged so as to enter into the inside of the opening 25 of the cantilever 24. Upon having a structure in which the plurality of converter cells 21 are arranged, the oscillating current converter 20 is fabricated in an integrated form.

In the oscillating current converter 20 having the above structure, the cantilever 4 of each converter cell 21 oscillates to generate an induced electromotive force in the coil 26. That is, in the oscillating current converter 20, the cantilever 24 of each converter cell 21 oscillates so that the magnet 28 capable of entering into the inside of the coil 26 undergoes a relative motion in the axial direction of the coil 26. In this case, the magnetic flux of the magnet 28 piercing through the coil 26 of each converter cell 21 greatly varies, and a large induced electromotive force generates in the coil 26.

According to the oscillating current converter 20 to which the invention is applied as described above, oscillation occurring on the cantilever 24 of each converter cell 21 can be efficiently converted into an electric current (electric power). Moreover, upon arranging the magnet 28 so as to enter into the inside of the opening 25 of the cantilever 24, the size of the device can be decreased. According to the invention, therefore, the oscillating current converter 20 fabricated by using the MEMS technology features a further decreased size and improved conversion efficiency (generation efficiency).

Further, the oscillating current converter 20 is provided with the plurality of converter cells 21 having different natural frequencies, so that the cantilever 24 of any one of the converter cells 21 resonates. Therefore the cantilevers 24 can be efficiently oscillated to cope with a wide range of frequencies, and the oscillation can be efficiently converted into an electric current (electric power). Therefore, the oscillating current converter 20 provided with the plurality of the converter cells 21 produces a large electromotive force.

Third Embodiment

Next, described below with reference to FIG. 3 is an oscillating current converter 30 according to a third embodiment.

Like the above oscillating current converter 1, the oscillating current converter 30 is a very small generator module fabricated in μ-sizes by utilizing the high precision three-dimensional machining technology called MEMS (micro electro mechanical systems) technology based on the semiconductor production technology or the laser machining technology.

Concretely, the oscillating current converter 30 includes a support portion 31, a first cantilever 32 cantilevered by the support portion 31, and a second cantilever 33 arranged facing the first cantilever 32 and is cantilevered by the support portion 31.

Among them, the support portion 31 is made from silicon of the shape of, for example, a rectangular parallelopiped shape. The first cantilever 32 and the second cantilever 33 are elongated resilient support pieces, are arranged in the same direction in parallel facing each other, and are formed integrally with the support portion 31. Further, the first cantilever 32 and the second cantilever 33 are cantilevered on the proximal end side thereof by the support portion 31, and oscillate on the distal end side thereof in a direction in which they approach, or separate away from, each other.

An opening 34 is formed in the first cantilever 32 on the distal end side thereof. The opening 34 is for permitting a magnet 37 that will be described later to enter into the inside thereof, and is formed by a hole that penetrates through the first cantilever 32. The opening 34 in FIG. 3 is of a circular shape but is not necessarily limited to this shape only and may be, for example, of an elliptic shape or a rectangular shape.

A coil 35 is provided on the upper surface of the first cantilever 32 being wound around the opening 34. The coil 35 is made from an electrically conducting thin metal film such as of nickel, copper or gold, and is formed as a pattern on the first cantilever 32 by using a photolithography technology or the like technology. Concretely, the coil 35 includes a coil pattern 35*a* spirally wound about the opening 34, a draw wiring 35*b* drawn from an end on the inner circumferential side of the coil pattern 35*a* toward the proximal end side of the first cantilever 32 being insulated from the coil pattern 35*a*, and a draw wiring 35*c* drawn from an end on the outer circumferential side of the coil pattern 35*a* toward the proximal end side of the first cantilever 32. The draw wirings 35*b* and 35*c* on the inner side and the outer side are electrically connected to a power source circuit 36 provided on the upper surface of the support portion 31. The power source circuit 36 rectifies and smoothes an electric current flowing into the coil 35, and converts the alternating current into a direct current to output it.

A magnet 37 is provided on the main surface of the second cantilever 33 facing the first cantilever 32. The magnet 37 is obtained by, for example, dispersing a magnetic powder of samarium cobalt in a polydimethylsiloxane (PDMS). Further, the magnet 37 is provided protruding like a pole upward from the main surface of the second cantilever 33 so as to enter into the inside of the opening 34 of the first cantilever 32, and is magnetized into N-pole and S-pole in the up-and-down direction. In FIG. 3, the magnet 37 is in the shape of a pole but is not necessarily limited thereto only and may, for example, be of a square pole shape or the like shape if it can enter into the inside of the opening 34.

In the oscillating current converter 30 having the above structure, at least one or both of the first cantilever 32 and the second cantilever 33 oscillate to generate an induced electromotive force in the coil 6. That is, in the oscillating current converter 30, the first cantilever 32 or the second cantilever 33 oscillates so that the magnet 37 capable of entering into the inside of the coil 35 undergoes a relative motion in the axial direction of the coil 35. In this case, the magnetic flux of the magnet 37 piercing through the coil 35 greatly varies, and a large induced electromotive force generates in the coil 35.

According to the oscillating current converter 30 to which the invention is applied as described above, oscillation occurring on the first cantilever 32 and on the second cantilever 33 can be efficiently converted into an electric current (electric power). Moreover, upon arranging the magnet 37 on the second cantilever 33 on the distal end side thereof so as to enter into the inside of the opening 34 of the first cantilever 32, the size of the device can be decreased. According to the invention, therefore, the oscillating current converter 30 fabricated by using the MEMS technology features a further decreased size and improved conversion efficiency (generation efficiency).

Fourth Embodiment

Next, described below with reference to FIG. 4 is an oscillating current converter 40 according to a fourth embodiment.

Like the above oscillating current converter 30, the oscillating current converter 40 is a very small generator module fabricated in μ-sizes by utilizing the high precision three-dimensional machining technology called MEMS (micro electro mechanical systems) technology based on the semiconductor production technology or the laser machining technology, and has a structure provided with a plurality of converter cells (generator cells) 41, each cell 21 comprising the above oscillating current converter 30.

Concretely, the oscillating current converter 40 includes a support portion 42, a plurality of first cantilevers 43 cantilevered by the support portion 42, and a plurality of second cantilevers 44 arranged facing the first cantilevers 43 and are cantilevered by the support portion 42.

Among them, the support portion 42 is made from silicon of the shape of, for example, a rectangular parallelopiped shape. The first cantilevers 43 and the second cantilevers 44 are elongated resilient support pieces, arranged in the same direction in parallel and facing each other, and are formed integrally with the support portion 42. The first cantilevers 43 and the second cantilevers 44 are cantilevered on the proximal end side thereof by the support portion 42, and oscillate on the distal end side thereof in a direction in which they approach, or separate away from, each other. Further, the plurality of first and second cantilevers 43 and 44 are arranged in parallel maintaining a predetermined distance in a direction at right angles with the cantilevers 43 and 44, and have lengths that are successively differing to differ their natural frequencies.

An opening 45 is formed in each first cantilever 43 on the distal end side thereof. The opening 45 is for permitting a magnet 48 that will be described later to enter into the inside thereof, and is formed by a hole that penetrates through the first cantilever 43. The opening 45 in FIG. 4 is of a circular shape but is not necessarily limited to this shape only and may be, for example, of an elliptic shape or a rectangular shape.

A coil 46 is provided on the upper surface of each first cantilever 43 being wound around the opening 45. The coil 46 is made from an electrically conducting thin metal film such as of nickel, copper or gold, and is formed as a pattern on the first cantilever 43 by using the photolithography technology or the like technology. Concretely, the coil 46 includes a coil pattern 46a spirally wound about the opening 45, a draw wiring 46b drawn from an end on the inner circumferential side of the coil pattern 46a toward the proximal end side of the first cantilever 43 being insulated from the coil pattern 46a, and a draw wiring 46c drawn from an end on the outer circumferential side of the coil pattern 46a toward the proximal end side of the first cantilever 43.

The coils 46 provided on the upper surfaces of the first cantilevers 43 have their draw wirings 46b on the inner side and draw wirings 46c on the outer side neighboring each other electrically connected to a power source circuit 47 provided on the upper surface of the support portion 42. The power source circuit 47 rectifies and smoothes an electric current flowing into the coils 46, and converts the alternating current into a direct current to output it.

Magnets 48 are provided on the surfaces of the second cantilevers 44 facing the first cantilevers 43. The magnets 48 are obtained by, for example, dispersing a magnetic powder of samarium cobalt in a polydimethylsiloxane (PDMS). Further, the magnets 48 are provided protruding like poles upward from the main surfaces of the second cantilevers 44 so as to enter into the inside of the openings 45 of the first cantilevers 43, and are magnetized into N-pole and S-pole in the up-and-down direction. In FIG. 4, the magnets 48 are in the shape of poles but are not necessarily limited thereto only and may, for example, be of a square pole shape or the like shape if they can enter into the inside of the openings 45.

This oscillating current converter 40 is constituted like the above oscillating current converter 30, and in which each converter cell 41 is constituted by the first cantilever 43 having the opening 45 on the distal end side thereof and is cantilevered on the proximal end side, the second cantilever 44 arranged facing the first cantilever 43 and is cantilevered on the proximal end side, the coil 46 wound around the opening 45 of the first cantilever 43, and the magnet 48 arranged on the second cantilever 44 on the distal end side so as to enter into the inside of the opening 45 of the first cantilever 43. Upon having a structure in which the plurality of converter cells 41 are arranged, the oscillating current converter 40 is fabricated in an integrated form.

In the oscillating current converter 40 having the above structure, at least one or both of the first cantilever 43 and the second cantilever 44 of each converter cell 41 oscillate to generate an induced electromotive force in the coil 46. That is, in the oscillating current converter 40, the first cantilever 43 or the second cantilever 44 of each converter cell 41 oscillates so that the magnet 48 capable of entering into the inside of the coil 46 undergoes a relative motion in the axial direction of the coil 46. In this case, the magnetic flux of the magnet 48 piercing through the coil 46 of each converter cell 41 greatly varies, and a large induced electromotive force generates in the coil 46.

According to the oscillating current converter 40 to which the invention is applied as described above, oscillation occurring on the first cantilever 43 and on the second cantilever 44 of each converter cell 41 can be efficiently converted into an electric current (electric power). Moreover, upon arranging the magnet 48 on the second cantilever 44 on the distal end side thereof so as to enter into the inside of the opening 45 of the first cantilever 43 in each converter cell 41, the size of the device can be decreased. According to the invention, therefore, the oscillating current converter 40 fabricated by using the MEMS technology features a further decreased size and improved conversion efficiency (generation efficiency).

Further, the oscillating current converter 40 is provided with the plurality of converter cells 41 having different natural frequencies, so that the cantilevers 43 and 44 of any one of the converter cells 41 resonate. Therefore, the cantilevers 43 and 44 can be efficiently oscillated to cope with a wide range of frequencies, and the oscillation can be efficiently converted into an electric current (electric power). Therefore, the oscillating current converter 40 provided with the plurality of the converter cells 41 produces a large electromotive force.

Fifth Embodiment

Next, described below with reference to FIG. 5 is an oscillating current converter 50 according to a fifth embodiment.

Like the above oscillating current converter 1, the oscillating current converter 50 is a very small generator module fabricated in μ-sizes by utilizing the high precision three-dimensional machining technology called MEMS (micro electro mechanical systems) technology based on the semiconductor production technology or the laser machining technology.

Concretely, the oscillating current converter 50 includes a base 51, a support portion 52 formed rising from one end of the base 51, a first cantilever 53 cantilevered by the support portion 52, and a second cantilever 54 arranged facing the first cantilever 53 and is cantilevered by the support portion 52.

Among them, the base 51 is made from silicon of the shape of, for example, a rectangular flat plate. The support portion 52 is formed integrally with the base 51, and is rising nearly at right angles with the main surface of the base 51. The first cantilever 53 and the second cantilever 54 are elongated resilient support pieces, are arranged in the same direction in parallel facing each other, and are formed integrally with the support portion 52. Further, the first cantilever 53 and the second cantilever 54 are cantilevered on the proximal end side thereof by the support portion 52, and oscillate on the distal end side thereof in a direction in which they approach, or separate away from, each other.

Openings 55 and 56 are formed in the first cantilever 53 and in the second cantilever 54 on the distal end side thereof. The openings 55 and 56 are for permitting a magnet 59 that will be described later to enter into the inside thereof, and are formed by holes that penetrate through the first and second cantilevers 53 and 54. The openings 55 and 56 in FIG. 5 are of a circular shape but are not necessarily limited to this shape only and may be, for example, of an elliptic shape or a rectangular shape.

A first coil 57A and a second coil 57B are provided on the upper surfaces of the first cantilever 53 and the second cantilever 54 being wound around the openings 55 and 56. The first and second coils 57A and 57B are made from an electrically conducting thin metal film such as of nickel, copper or gold, and are formed as patterns on the first and second cantilevers 53 and 54 by using a photolithography technology or the like technology.

Concretely, the first coil 57A includes a coil pattern 57a spirally wound about the opening 55, a draw wiring 57b drawn from an end on the inner circumferential side of the coil pattern 57a toward the proximal end side of the first cantilever 53 being insulated from the coil pattern 57a, and a draw wiring 57c drawn from an end on the outer circumferential side of the coil pattern 57a toward the proximal end side of first the cantilever 53. The draw wirings 57b and 57c on the inner side and the outer side of the first cantilever 53 are electrically connected to a power source circuit 58 provided on the upper surface of the support portion 52.

Like the first coil 57A, the second coil 57B, too, includes a coil pattern spirally wound about the opening 56, a draw wiring drawn from an end on the inner circumferential side of the coil pattern toward the proximal end side of the second cantilever 54 being insulated from the above coil pattern, and a draw wiring drawn from an end on the outer circumferential side of the coil pattern toward the proximal end side of second the cantilever 54.

The draw wirings on the inner side and outer side of the second cantilever 54 are connected to buried wirings (not shown) formed in the support portion 52, and are electrically connected to the power source circuit 58 provided on the upper surface of the support portion 52 via the buried wirings. The power source circuit 58 rectifies and smoothes an electric current flowing into the first coil 57A and the second coil 57B, and converts the alternating current into a direct current to output it.

A magnet 59 is provided on the main surface of the base 51. The magnet 59 is obtained by, for example, dispersing a magnetic powder of samarium cobalt in a polydimethylsiloxane (PDMS). Further, the magnet 59 is provided protruding like a pole upward from the main surface of the base 51 so as to enter into the inside of the openings 55 and 56 of the first and second cantilevers 53 and 54, and is magnetized into N-pole and S-pole in the up-and-down direction. In FIG. 5, the magnet 59 is in the shape of a pole but is not necessarily limited thereto only and may, for example, be of a square pole shape or the like shape if it can enter into the inside of the openings 55 and 56.

In the oscillating current converter 50 having the above structure, the first cantilever 53 and the second cantilever oscillate to generate an induced electromotive force in the first coil 57A and in the second coil 57B. That is, in the oscillating current converter 50, the first and second cantilevers 53 and 54 oscillate so that the magnet 59 capable of entering into the inside of the coils 57A and 57B undergoes a relative motion in the axial direction of the first and second coils 57A and 57B. In this case, the magnetic flux of the magnet 59 piercing through the first and second coils 57A and 57B greatly varies, and a large induced electromotive force generates in the first and second coils 57A and 57B.

According to the oscillating current converter 50 to which the invention is applied as described above, oscillation occurring on the first cantilever 53 and on the second cantilever 54 can be efficiently converted into an electric current (electric power). Moreover, upon arranging the magnet 59 so as to enter into the inside of the openings 55 and 56 of the first and second cantilevers 53 and 54, the size of the device can be decreased. According to the invention, therefore, the oscillating current converter 50 fabricated by using the MEMS technology features a further decreased size and improved conversion efficiency (generation efficiency).

Sixth Embodiment

Next, described below with reference to FIG. 6 is an oscillating current converter 60 according to a sixth embodiment.

Like the above oscillating current converter 50, the oscillating current converter 60 is a very small generator module fabricated in μ-sizes by utilizing the high precision three-dimensional machining technology called MEMS (micro electro mechanical systems) technology based on the semiconductor production technology or the laser machining technology, and has a structure provided with a plurality of converter cells (generator cells) 61, each cell 61 comprising the above oscillating current converter 50.

Concretely, the oscillating current converter 60 includes a base 62, a support portion 63 formed rising from one end of the base 62, a plurality of first cantilevers 64 cantilevered by the support portion 63, and a plurality of second cantilevers 65 arranged facing the first cantilevers 64 and are cantilevered by the support portion 63.

Among them, the base 62 is made from silicon of the shape of, for example, a rectangular flat plate. The support portion 63 is formed integrally with the base 62, and is rising nearly at right angles with the main surface of the base 62. The first cantilevers 64 and the second cantilevers 65 are elongated resilient support pieces, are arranged in the same direction in parallel facing each other, and are formed integrally with the support portion 63. Further, the first cantilevers 64 and the second cantilevers 65 are cantilevered on the proximal end side thereof by the support portion 63, and oscillate on the distal end side thereof in a direction in which they approach, or separate away from, each other. Further, the plurality of first and second cantilevers 64 and 65 are arranged in parallel maintaining a predetermined distance in a direction at right angles with the cantilevers 64 and 65, and have lengths that are successively differed to differ their natural frequencies.

Openings 66 and 67 are formed in the first cantilever 64 and in the second cantilever 65 on the distal end side thereof. The openings 66A and 66B are for permitting magnets 69 that will be described later to enter into the inside thereof, and are formed by holes that penetrate through the first and second cantilevers 64 and 65. The openings 66A and 66B in FIG. 6 are of a circular shape but is not necessarily limited to this shape only and may be, for example, of an elliptic shape or a rectangular shape.

First coils 67A and second coils 67B are provided on the upper surfaces of the first cantilevers 64 and the second cantilevers 65 being wound around the openings 66A and 66B. The first and second coils 67A and 67B are made from an electrically conducting thin metal film such as of nickel, copper or gold, and are formed as patterns on the first and second cantilevers 64 and 65 by using the photolithography technology or the like technology.

Concretely, the first coil 67A includes a coil pattern 67a spirally wound about the opening 66A, a draw wiring 67b drawn from an end on the inner circumferential side of the coil pattern 67a toward the proximal end side of the first cantilever 64 being insulated from the coil pattern 67a, and a draw wiring 67c drawn from an end on the outer circumferential side of the coil pattern 67a toward the proximal end side of the first cantilever 64.

The first coils 67A provided on the upper surfaces of the first cantilevers 64 have their draw wirings 67b on the inner side and draw wirings 67c on the outer side neighboring each other electrically connected to a power source circuit 68 provided on the upper surface of the support portion 63.

Like the first coil 67A, the second coil 67B, too, includes a coil pattern 67a spirally wound about the opening 66B, a draw wiring 67b drawn from an end on the inner circumferential side of the coil pattern 67a toward the proximal end side of the second cantilever 65 being insulated from the coil pattern 67a, and a draw wiring 67c drawn from an end on the outer circumferential side of the coil pattern 67a toward the proximal end side of the second cantilever 65.

The draw wirings 67b and 67c on the inner side and outer side of the second cantilever 65 are connected to buried wirings (not shown) formed in the support portion 63, and are electrically connected to the power source circuit 68 provided on the upper surface of the support portion 63 via the buried wirings. The power source circuit 68 rectifies and smoothes an electric current flowing into the first coil 67A and second coil 67B, and converts the alternating current into a direct current to output it.

A plurality of magnets 69 are provided on the main surface of the base 62. These magnets 69 are obtained by, for example, dispersing a magnetic powder of samarium cobalt in a polydimethylsiloxane (PDMS). Further, the magnets 69 are provided protruding like poles upward from the main surface of the base 62 so as to enter into the inside of the openings 66A and 66B of the first and second cantilevers 64 and 65, and are magnetized into N-pole and S-pole in the up-and-down direction. In FIG. 6, the magnets 69 are in the shape of poles but are not necessarily limited thereto only and may, for example, be of a square pole shape or the like shape if they can enter into the inside of the openings 66A and 66B.

This oscillating current converter 60 is constituted like the above oscillating current converter 50, and in which a converter cell 61 is constituted by the first cantilever 64 having the opening 66A on the distal end side thereof and is cantilevered on the proximal end side, the second cantilever 65 arranged facing the first cantilever 64, having the opening 66B formed on the distal end side thereof and being cantilevered on the proximal end side thereof, the first coil 67A wound around the opening 66A of the first cantilever 64, the second coil 67B wound around the opening 66B of the second cantilever 65, and the magnet 69 arranged so as to enter into the inside of the openings 66A and 66B of the first and second cantilevers 64 and 65. Upon having a structure in which the plurality of converter cells 61 are arranged, the oscillating current converter 60 is fabricated in an integrated form.

In the oscillating current converter 60 having the above structure, the first cantilever 64 and the second cantilever 65 of each converter cell 61 oscillate to generate an induced electromotive force in the first coil 67A and in the second coil 67B. That is, in the oscillating current converter 60, the first and second cantilevers 64 and 65 of each converter cell 61 oscillate so that the magnet 69 capable of entering into the inside of the first and second coil 67A and 67B undergoes a relative motion in the axial direction of the first and second coils 67A and 67B. In this case, the magnetic flux of the magnet 69 piercing through the first and second coil 67A and 67B greatly varies, and a large induced electromotive force generates in the first and second coils 67A and 67B.

According to the oscillating current converter 60 to which the invention is applied as described above, oscillation occurring on the first cantilever 64 and on the second cantilever 65 of each converter cell 61 can be efficiently converted into an electric current (electric power). Moreover, upon arranging the magnet 69 so as to enter into the inside of the openings 66A and 66B of the first and second cantilevers 64 and 65 of the converter cell 61, the size of the device can be decreased. According to the invention, therefore, the oscillating current converter 60 fabricated by using the MEMS technology features a further decreased size and improved conversion efficiency (generation efficiency).

Further, the oscillating current converter 60 is provided with the plurality of converter cells 61 having different natural frequencies, so that the first and second cantilevers 64 and 65 of any one of the converter cells 61 resonate. Therefore the cantilevers 64 and 65 can be efficiently oscillated to cope with a wide range of frequencies, and the oscillation can be efficiently converted into an electric current (electric power). Therefore, the oscillating current converter 60 provided with the plurality of the converter cells 61 produces a large electromotive force.

Other Embodiments

The invention is not necessarily limited to those of the above first to sixth embodiments only but can be further varied in a scope without departing from the gist of the invention.

For example, the number of the converter cells 21, 41 and 61 constituting the above oscillating current converters 20, 40 and 60 is not particularly limited but may be arbitrarily selected.

Further, the oscillating current converters 20, 40 and are not limited to those of the constitution in which the above plurality of converter cells 21, 41 and 61 are arranged in the same direction on one side of the support portions 23, and 52, but may further be so constituted that the plurality of converter cells 21, 41 and 61 are arranged in the opposite directions on both sides of the support portions 23, 42 and or that the plurality of converter cells 21, 41 and 61 are arranged in the opposite directions on both sides of the support portions 23, 42 and 52 that are facing each other.

As for the first cantilevers 53, 64 and the second cantilevers 54, 65 constituting the oscillating current converters 50 and 60, the invention is not limited to those in which they are formed in pairs but may further be so constituted that the cantilevers having coils wound around the openings on the distal end side are arranged in a plural number (two or more) in the direction of lamination.

Further, the first cantilevers 32, 43, 53, 64 and the second cantilevers 33, 44, 54, 65 constituting the oscillating current converters 30, 40, 50, 60 may be constituted in the same direction in parallel and facing each other, and may be integrally formed with the support portions 31, 42, 52, 63 via coupling portions coupling the proximal end sides thereof.

In this case, the first cantilevers 32, 43, 53, 64 and the second cantilevers 33, 44, 54, 65 are coupled together via coupling portions to become of the type of so-called tuning fork. Namely, the first cantilevers 32, 43, 53, 64 and the second cantilevers 33, 44, 54, 65 greatly oscillate while resonating. In the case of this constitution, therefore, it is allowed to obtain a large electromotive force.

For example, an oscillating current converter 50A shown in FIG. 7 exemplifies a case where the above oscillating current converter 50 is modified into the one of the tuning fork type. Concerning the oscillating current converter 50A, the portions equivalent to those of the above oscillating current converter 50 are not described again but are shown in the drawing by attaching the same reference numerals.

In the oscillating current converter 50A as shown in FIG. 7, the first cantilever 53 and the second cantilever 54 are arranged in the same direction in parallel facing each other, and are integrally formed with the support portion 52 via a coupling portion 50a for coupling the proximal end sides thereof. Further, the first cantilever 53 and the second cantilever 54 are coupled together via the coupling portion 50a to become of the type of so-called tuning fork. Therefore, the first cantilever 53 and the second cantilever 54 oscillate on the distal end side thereof in a direction in which they approach, or separate away from, each other resonating together. In other respects, the oscillating current converter 50A has nearly the same structure as that of the oscillating current converter 50.

In the oscillating current converter 50A having the above structure, the first cantilever 53 and the second cantilever 54 oscillate to generate an induced electromotive force in the first coil 57A and in the second coil 57B. That is, in the oscillating current converter 50A, the first and second cantilevers 53 and 54 oscillate so that the magnet 59 capable of entering into the inside of the coils 57A and 57B undergoes a relative motion in the axial direction of the first and second coils 57A and 57B. In this case, the magnetic flux of the magnet 59 piercing through the first and second coils 57A and 57B greatly varies, and a large induced electromotive force generates in the first and second coils 57A and 57B.

In this oscillating current converter 50A, further, the first cantilever 53 and the second cantilever 54 are coupled together via the coupling portion 50a to become of the type of so-called tuning fork. Therefore, the first cantilever 53 and the second cantilever 54 greatly oscillate resonating together, and a large electromotive force is obtained.

In the oscillating current converter 50A as described above, oscillation occurring on the first cantilever 53 and on the second cantilever 54 can be efficiently converted into an electric current (electric power). Moreover, upon arranging the magnet 59 so as to enter into the inside of the openings 55 and 56 of the first and second cantilevers 53 and 54, the size of the device can be decreased. According to the invention, therefore, the oscillating current converter 50A fabricated by using the MEMS technology features a further decreased size and improved conversion efficiency (generation efficiency).

In the above first to sixth embodiments, the coil is arranged on one surface of the cantilever. However, the coils may be arranged on both sides of the cantilever.

For example, an oscillating current converter 1A shown in FIG. 8 exemplifies a case where coils 6A and 6B are arranged on both surfaces of the cantilever 4 constituting the oscillating current converter 1. In this case, a large induced electromotive force can be generated in the coils 6A and 6B arranged on both surfaces of the cantilever 4. Concerning the oscillating current converter 1A shown in FIG. 8, the portions equivalent to those of the above oscillating current converter 1 are not described again but are shown in the drawing by attaching the same reference numerals.

In the above first to sixth embodiments, further, the weight may be arranged on the distal end side of the cantilever. The weight may be formed integrally with the cantilever or may be separately attached to an end of the cantilever.

For example, an oscillating current converter 1B shown in FIG. 9 exemplifies a case where a weight 9 is arranged on the end of the cantilever 4 constituting the oscillating current converter 1. In this case, amplification of the cantilever 4 increases to obtain a large electromotive force. By varying the weight 9, further, it is allowed to cope with a wide range of frequencies. Concerning the oscillating current converter 1B shown in FIG. 9, the portions equivalent to those of the above oscillating current converter 1 are not described again but are shown in the drawing by attaching the same reference numerals.

(Method of Fabricating an Oscillating Current Converter)

Next, described below is a method of producing an oscillating current converter to which the invention is applied as a case of producing the above oscillating current converter 1.

Referring to FIG. 10, the above oscillating current converter 1 is fabricated by preparing a lower substrate 11 that includes a base 2, a lower support portion 3a formed so as to rise from an end of the base 2 and a magnet 8 formed on the upper surface of the base 2; forming an upper substrate 12 that includes a cantilever 4 having an opening 5 formed on the distal end side thereof, an upper support portion 3b formed on the proximal end side of the cantilever 4, a coil 6 formed on the surface of the upper support portion 3b and a power source circuit 7; joining the lower support portion 3a and the upper support portion 3b together in position so that the magnet 8 is exposed through the opening 5 of the cantilever 4; and integrating the lower substrate 11 and the upper substrate 12 together.

To fabricate the oscillating current converter 1, further, there are prepared a piece of lower mother substrate 11A forming, on the same surface, a plurality of portions that serve as the lower substrates 11 as shown in FIGS. 11(a) and (b), and a piece of upper mother substrate 12A forming, on the same surface, a plurality of portions that serve as the upper substrates 12 as shown in FIGS. 12(a) and (b). Thereafter, as shown in FIGS. 13(a) and (b), a junction block 13 obtained by joining the lower mother substrate 11A and the upper mother substrate 12A together is cut into individual chips to fabricate a plurality of oscillating current converters 1 at one time.

A glass substrate can be used as the lower mother substrate 11A, a silicon substrate can be used as the upper mother substrate 12A, and an anodic junction can be applied for joining the lower mother substrate 11A and the upper mother substrate 12A together. Further, grooves 14 and 15 may be formed in the lower mother substrate 11A and in the upper mother substrate 12A along the dividing lines of the chips for easy division into the individual chips. In the lower substrate 11, a step between the base 2 and the lower support portion 3a can be formed by, for example, dicing, etching or laser working. Further, the magnet 8 can be attached to the base 2 by using, for example, a micro manipulator. The oscillating current converter 1 that is fabricated has a maximum length of, for example, about 100 to about 1000 μm and a maximum thickness of, for example, about 0.5 to about 10 μm.

According to the method of fabricating the oscillating current converter 1 to which the invention is applied as described above, it is allowed to fabricate the oscillating current converters 1 of a very small size maintaining good precision at one time relying upon the above-mentioned MEMS technology without through complex steps.

This embodiment has dealt with the case of fabricating the above oscillating current converter 1. However, other oscillating current converters can also be, similarly, fabricated in the same manner. Concretely, the oscillating current converters 30 and 50 (50A) can be fabricated at one time by successively laminating a first (mother) substrate including the constitution on the side of the first cantilevers 32 and 53 as well as a second (mother) substrate including the constitution on the side of the second cantilevers 33 and 54 on the lower (mother) substrate 11(11A) to prepare a junction block, and cutting the junction block into individual chips. Further, the oscillating current converters 20, 40 and 60 can also be fabricated at one time by cutting the above junction block into the chips each having a plurality of converter cells 21, 41, 61.

Seventh Embodiment

Next, described below with reference to FIG. 14 is an oscillating current converter 70 according to a seventh embodiment.

Referring to FIG. 14, the oscillating current converter 70 is a very small generator module fabricated in μ-sizes by utilizing the high precision three-dimensional machining technology called MEMS (micro electro mechanical systems) technology based on the semiconductor production technology or the laser machining technology.

Concretely, the oscillating current converter 70 includes a base 71, an oscillator 73 attached to the surface of the base 71 via a spring 72, a coil 74 arranged on the surface of the oscillator 73, and a magnet 75 arranged on the surface of the base 71.

Among them, the base 71 is made from silicon of the shape of, for example, a rectangular flat plate. The spring 72 is a coil spring having a length of about several tens of microns and spirally wound in the axial direction. The oscillator 73 comprises, for example, an elongated silicon substrate. The oscillator 73 is arranged facing the main surface of the base 2, and is cantilevered on one end side thereof via the spring 72. Therefore, the oscillator 73 is allowed to oscillate on the other end side thereof in a direction in which it approaches, or separates away from, the main surface of the base 71.

The coil 74 is made from an electrically conducting thin metal film such as of nickel, copper or gold, and is formed as a pattern on the oscillator 73 by using a photolithography technology or the like technology. Concretely, the coil 74 includes a coil pattern 74a that is spirally wound, a draw wiring 74b drawn from an end on the inner circumferential side of the coil pattern 74a toward the one end side of the oscillator 73 being insulated from the coil pattern 74a, and a draw wiring 74c drawn from an end on the outer circumferential side of the coil pattern 74a toward the one end side of the oscillator 73. The draw wirings 74b and 74c on the inner side and the outer side are, though not shown, electrically connected to a power source circuit provided on the upper surface of the base 71 by bonding wires. The power source circuit rectifies and smoothes an electric current flowing into the coil 74, and converts the alternating current into a direct current to output it.

The magnet 75 is obtained by, for example, dispersing a magnetic powder of samarium cobalt in a polydimethylsiloxane (PDMS). Further, the magnet 75 is formed in a rectangular parallelopiped shape, is arranged near the other end side of the oscillator 73 in a manner that the lengthwise direction thereof is at right angles with the lengthwise direction of the oscillator 73, and is magnetized into N-pole and S-pole in the direction of width thereof. In FIG. 14, the magnet 8 is of the rectangular parallelopiped shape but is not necessarily limited thereto only and can be suitably varied so as to be put into practice. Further, the direction of magnetization can be changed. Further, the arrangement of the magnet 75 can be suitably varied so as to be put into practical use.

In the oscillating current converter 70 having the above structure, the oscillator 73 oscillates to generate an induced electromotive force in the coil 74. Concretely, in the oscillating current converter 70, the oscillator 73 attached to the surface of the base 71 via the spring 72 oscillates. Therefore, the oscillator 73 oscillates maintaining a large amplitude. Besides, the oscillation attenuates slowly and the oscillator 73 continues to oscillate for an extended period of time.

Therefore, the distance the magnet 75 relatively moves in the axial direction of the coil 74 undergoes a large change, and the magnetic flux of the magnet 75 piercing through the coil 74 undergoes a large change, too, making it possible to generate a large induced electromotive force in the coil 74 as well as to generate the induced electromotive force for an extended period of time.

According to the oscillating current converter 70 to which the invention is applied as described above, oscillation occurring on the oscillator 73 can be efficiently converted into an electric current (electric power). According to the invention, therefore, the oscillating current converter 70 fabricated by using the MEMS technology features a further decreased size and improved conversion efficiency (generation efficiency).

Eighth Embodiment

Next, described below with reference to FIG. 15 is an oscillating current converter 80 according to an eighth embodiment.

Concerning the oscillating current converter 80, the portions equivalent to those of the above oscillating current converter 70 are not described again but are shown in the drawing by attaching the same reference numerals.

In the oscillating current converter 80 as shown in FIG. 15, the oscillator 73 is supported on both end sides thereof by a pair of springs 72. The magnet 75 is arranged near the oscillator 73 in a manner that the lengthwise direction thereof is in parallel with the lengthwise direction of the oscillator 73. In other respects, the oscillating current converter 80 has nearly the same structure as the above oscillating current converter 70.

In the oscillating current converter 80 having the above structure, the oscillator 73 oscillates to generate an induced electromotive force in the coil 74. Concretely, in the oscillating current converter 70, the oscillator 73 attached to the surface of the base 71 via the pair of springs 72 oscillates. Therefore, the oscillator 73 oscillates maintaining a large amplitude. Besides, the oscillation attenuates slowly and the oscillator 73 continues to oscillate for an extended period of time.

Therefore, the distance the magnet 75 relatively moves in the axial direction of the coil 74 undergoes a large change, and the magnetic flux of the magnet 75 piercing through the coil 74 undergoes a large change, too, making it possible to generate a large induced electromotive force in the coil 74 as well as to generate the induced electromotive force for an extended period of time. In particular, the oscillator 73 supported at both ends on the surface of the base 71 via the pair of springs 72 exhibits more stable oscillation characteristics than those of the oscillator that is cantilevered, and features improved frequency.

According to the oscillating current converter 80 to which the invention is applied as described above, oscillation occurring on the oscillator 73 can be efficiently converted into an electric current (electric power). According to the invention, therefore, the oscillating current converter 80 fabricated by using the MEMS technology features a further decreased size and improved conversion efficiency (generation efficiency).

Here, the oscillating current converter to which the invention is applied may assume a structure in which the oscillating current converter 70 or 80 is formed as a converter cell (generator cell), and the base thereof is provided with a plurality of the converter cells. This makes it possible to obtain the oscillating current converter in an integrated form. Further, the plurality of converter cells may have the oscillators 73 of which the lengths are successively differed to differ their natural frequencies. Therefore, the oscillator 73 of any one of the plurality of converter cells can be resonated so as to efficiently oscillate while coping with a wide range of frequencies to efficiently convert the oscillation into an electric current (electric power). Accordingly, the oscillating current converter equipped with the plurality of the converter cells can produce a large electromotive force.

Ninth Embodiment

Next, described below with reference to FIG. 16 is an oscillating current converter 90 according to a ninth embodiment.

Concerning the oscillating current converter 90, the portions equivalent to those of the above oscillating current converter 80 are not described again but are shown in the drawing by attaching the same reference numerals.

In the oscillating current converter 90 as shown in FIG. 16, an opening 76 is formed in the oscillator 73, and a coil 77 is arranged being wound around the opening 76 instead of arranging the above coil 74. Instead of the above magnet 75, further, a magnet 78 is arranged on the main surface of the base 71 so as to enter into the inside of the opening 76 of the oscillator 73. In other respects, the oscillating current converter 90 has nearly the same structure as the above oscillating current converter 80.

Concretely, the opening 76 enables the magnet 78 to enter into the inside thereof, and is formed by a hole penetrating through nearly the central portion of the oscillator 73. The opening 76 in FIG. 16 is of a circular shape but is not necessarily limited to this shape only and may be, for example, of an elliptic shape or a rectangular shape.

The coil 77 is made from an electrically conducting thin metal film such as of nickel, copper or gold, and is formed as a pattern on the cantilever 4 by using a photolithography technology or the like technology. Concretely, the coil 77 includes a coil pattern 77a that is spirally wound about the opening 76, a draw wiring 77b drawn from an end on the inner circumferential side of the coil pattern 77a toward the one end side of the oscillator 73 being insulated from the coil pattern 77a, and a draw wiring 77c drawn from an end on the outer circumferential side of the coil pattern 77a toward the one end side of the oscillator 73. The draw wirings 77b and 77c on the inner side and the outer side are, though not shown, electrically connected to a power source circuit provided on the upper surface of the base 71 by bonding wires. The power source circuit rectifies and smoothes an electric current flowing into the coil 74, and converts the alternating current into a direct current to output it.

The magnet 78 is obtained by, for example, dispersing a magnetic powder of samarium cobalt in a polydimethylsiloxane (PDMS). Further, the magnet 78 is formed like a pole protruding upward from the main surface of the base 71 so as to enter into the inside of the opening 76 of the oscillator 73, and is magnetized into N-pole and S-pole in the up-and-down direction. In FIG. 16, the magnet 78 is of the shape of a pole but is not necessarily limited thereto only and may be, for example, of the shape of a square pole if it can enter into the inside of the opening 76.

In the oscillating current converter 90 having the above structure, the oscillator 73 oscillates to generate an induced electromotive force in the coil 74. Concretely, in the oscillating current converter 90, the oscillator 73 attached to the surface of the base 71 via the pair of springs 72 oscillates. Therefore, the oscillator 73 oscillates maintaining a large amplitude. Besides, the oscillation attenuates slowly and the oscillator 73 continues to oscillate for an extended period of time.

Therefore, the distance the magnet 75 relatively moves in the axial direction of the coil 74 undergoes a large change, and the magnetic flux of the magnet 75 piercing through the coil 74 undergoes a large change, too, making it possible to generate a large induced electromotive force in the coil 74 as well as to generate the induced electromotive force for an extended period of time. In particular, the oscillator 73 supported at both ends on the surface of the base 71 via the pair of springs 72 exhibits more stable oscillation characteristics than those of the oscillator that is cantilevered, and features improved frequency.

In the oscillating current converter 90, further, the magnet 78 capable of entering into the inside of the coil 77 undergoes a relative motion in the axial direction of the coil 77. In this case, the magnetic flux of the magnet 78 piercing through the coil 77 can be greatly changed to generate a large induced electromotive force in the coil 77.

According to the oscillating current converter 80 to which the invention is applied as described above, oscillation occurring on the oscillator 73 can be efficiently converted into an electric current (electric power). Further, the magnet 78 is arranged so as to enter into the inside of the opening 76 of the oscillator 73 making it possible to decrease the size of the device. According to the invention, therefore, the oscillating current converter 80 fabricated by using the MEMS technology features a further decreased size and improved conversion efficiency (generation efficiency).

Tenth Embodiment

Next, described below with reference to FIG. 17 is an oscillating current converter 100 according to a tenth embodiment.

Concerning the oscillating current converter 100, the portions equivalent to those of the above oscillating current converter 90 are not described again but are shown in the drawing by attaching the same reference numerals.

The oscillating current converter 100 has a structure provided with a plurality of converter cells (generator cells) 101 on a base 71A, each cell 101 comprising the above oscillating current converter 90. The plurality of converter cells 101 are arranged in parallel maintaining a predetermined distance and have the lengths of the oscillators 73 that are successively differed to differ their natural frequencies. In other respects, the oscillating current converter 100 has nearly the same structure as the oscillating current converter 90.

In the oscillating current converter 100 having the above structure, the converter cells 101 are arranged in a plural number in an integrated form. In the oscillating current converter 100, further, the oscillators 73 of the converter cells 101 oscillate to generate an induced electromotive force in the coils 74. Concretely, in the oscillating current converter 100, the oscillator 73 attached to the surface of the base 71A of the converter cell 21 via the pair of springs 72 oscillates. Therefore, the oscillator 73 oscillates maintaining a large amplitude. Besides, the oscillation attenuates slowly and the oscillator 73 continues to oscillate for an extended period of time.

Therefore, the distance the magnet 75 relatively moves in the axial direction of the coil 74 in the converter cell 101 undergoes a large change, and the magnetic flux of the magnet 75 piercing through the coil 74 undergoes a large change, too, making it possible to generate a large induced electromotive force in the coil 74 as well as to generate the induced electromotive force for an extended period of time. In particular, the oscillator 73 supported at both ends on the surface of the base 71 via the pair of springs 72 exhibits more stable oscillation characteristics than those of the oscillator that is cantilevered, and features improved frequency.

In the oscillating current converter 100, further, the magnet 78 capable of entering into the inside of the coil 77 of the converter cell 101 undergoes a relative motion in the axial direction of the coil 77. In this case, the magnetic flux of the magnet 78 piercing through the coil 77 of the converter cell 101 can be greatly changed to generate a large induced electromotive force in the coil 77.

According to the oscillating current converter 100 to which the invention is applied as described above, oscillation occurring on the oscillator 73 of the converter cell 101 can be efficiently converted into an electric current (electric power). Further, the magnet 78 is arranged so as to enter into the inside of the opening 76 of the oscillator 73 making it possible to decrease the size of the device. According to the invention, therefore, the oscillating current converter 100 fabricated by using the MEMS technology features a further decreased size and improved conversion efficiency (generation efficiency).

Further, the oscillating current converter 100 is provided with the plurality of converter cells 101 having dissimilar natural frequencies, enabling the oscillator 73 of any one of the converter cells 101 to resonate. Therefore, the oscillators 73 can be efficiently oscillated while coping with a wide range of frequencies to efficiently convert the oscillation into an electric current (electric power). Accordingly, the oscillating current converter 100 equipped with the plurality of the converter cells 101 can produce a large electromotive force.

Eleventh Embodiment

Next, described below with reference to FIG. 18 is an oscillating current converter 110 according to an eleventh embodiment.

Referring to FIG. 18, the oscillating current converter 110 is a very small generator module fabricated in µ-sizes by utilizing the high precision three-dimensional machining technology called MEMS (micro electro mechanical systems) technology based on the semiconductor production technology or the laser machining technology.

Concretely, the oscillating current converter 110 includes a base 111, a first oscillator 113A attached to the surface of the base 111 via springs 112A, a second oscillator 113B arranged facing the first oscillator 113A and is attached to the surface of the base 111 via springs 112B, a first coil 114A arranged on the surface of the first oscillator 113A, a second coil 114B arranged on the surface of the second oscillator 113B, and a magnet 115 arranged on the surface of the base 111.

Among them, the base 111 is made from silicon of the shape of, for example, a rectangular flat plate. The springs 112A and 112B are coil springs having lengths of about several tens of microns and spirally wound in the axial direction, the springs 112B on the side of the second oscillator 113B being longer than the springs 112A on the side of the first oscillator 113A.

The first and second oscillators 113A and 113B comprise, for example, elongated silicon substrates, the second oscillator 113B being longer than the first oscillator 113A. The first oscillator 113A is arranged facing the main surface of the base 111, and is supported on both end sides thereof via the pair of springs 112A. The second oscillator 113B, on the other hand, is positioned over the first oscillator 113A, is arranged in parallel with the first oscillator 113A, is positioned on the outer side of the first oscillator 113A, and is supported on both end sides thereof via the pair of springs 112B. Therefore, the first oscillator 113A is positioned under the second oscillator 113B in a manner that the first oscillator 113A and the second oscillator 113B are laminated one upon the other.

Openings 116A and 116B are formed in the first and second oscillators 113A and 113B in nearly the central portions thereof. The openings 116A and 116B are for permitting the magnet 115 that will be described later to enter into the inside thereof, and are formed by holes that penetrate through the first and second oscillators 113A and 113B. The openings 116A and 116B in FIG. 18 are of a circular shape but are not necessarily limited to this shape only and may be, for example, of an elliptic shape or a rectangular shape.

The first and second coils 114A and 114B are made from an electrically conducting thin metal film such as of nickel, copper or gold, and are formed as patterns on the first and second oscillators 113A and 113B by using a photolithography technology or the like technology. Concretely, the first and second coils 114A and 114B include coil patterns 114$a$ that are spirally wound, draw wirings 114$b$ drawn from the ends on the inner circumferential side of the coil patterns 114$a$ toward the ends on one side of the first and second oscillators 113A and 113B being insulated from the coil patterns 114$a$, and draw wirings 114$c$ drawn from the ends on the outer circumferential side of the coil patterns 114$a$ toward the ends on one side of the first and second oscillators 113A and 113B. The draw wirings 114$b$ and 114$c$ on the inner side and the outer side are, though not shown, electrically connected to a power source circuit provided on the upper surface of the base 111 by bonding wires. The power source circuit rectifies and smoothes an electric current flowing into the first and second coils 114A and 114B, and converts the alternating current into a direct current to output it.

The magnet 115 is obtained by, for example, dispersing a magnetic powder of samarium cobalt in a polydimethylsiloxane (PDMS). Further, the magnet 115 is formed in the shape of a pole protruding upward from the main surface of the base 111 so as to enter into the inside of the openings 116A and 116B of the first and second oscillators 113A and 113B, and is magnetized into N-pole and S-pole in the up-and-down direction. In FIG. 18, the magnet 115 is of the pole-like shape but is not necessarily limited thereto only so as to enter into the inside of the openings 116A and 116B and may be, for example, of a square pole shape.

In the oscillating current converter 110 having the above structure, the first and second oscillators 113A and 113B oscillate to generate an induced electromotive force in the first and second coils 114A and 114B. Concretely, in the oscillating current converter 110, the first oscillator 113A attached to the surface of the base 111 via the springs 112A oscillates together with the second oscillator 113B that is arranged facing the first oscillator 113A and is attached to the surface of the base 111 via the springs 112B. Therefore, the first and second oscillators 113A and 113B oscillate maintaining a large amplitude. Besides, the oscillation attenuates slowly and the first and second oscillators 113A and 113B continue to oscillate for an extended period of time.

Therefore, the distance the magnet 115 relatively moves in the axial direction of the first and second coils 114A and 114B undergoes a large change, and the magnetic flux of the magnet 115 piercing through the first and second coils 114A and 114B undergoes a large change, too, making it possible to generate a large induced electromotive force in the first and second coils 114A and 114B as well as to generate the induced electromotive force for an extended period of time. In particular, the first and second oscillators 113A and 113B supported at both ends on the surface of the base 111 via the pair of springs 112A and 112B exhibit more stable oscillation characteristics than those of the oscillators that are cantilevered, and feature improved frequency.

In the oscillating current converter 110, further, the magnet 115 capable of entering into the inside of the first and second coils 114A and 114B undergoes a relative motion in the axial direction of the first and second coils 114A and 114B. In this case, the magnetic flux of the magnet 115 piercing through the first and second coils 114A and 114B greatly varies, and a large induced electromotive force generates in the first and second coils 114A and 114B.

According to the oscillating current converter 110 to which the invention is applied as described above, oscillation occurring on the first and second oscillators 113A and 113B can be efficiently converted into an electric current (electric power). Moreover, upon arranging the magnet 115 so as to enter into the inside of the openings 116A and 116B of the first and second oscillators 113A and 113B, the size of the device can be decreased. According to the invention, therefore, the oscillating current converter 110 fabricated by using the MEMS technology features a further decreased size and improved conversion efficiency (generation efficiency).

In the oscillating current converter 110, further, the first oscillator 113A and the second oscillator 113B have different lengths and, therefore, have different natural frequencies. In this case, either oscillator 113A or 113B is resonated; i.e., the oscillators 113A and 113B can be efficiently oscillated while coping with a wide range of frequencies to efficiently convert the oscillation into an electric current (electric power). Therefore, the oscillating current converter 110 provided with the first and second oscillators 113A and 113B of different lengths produces a large electromotive force.

Here, the oscillating current converter to which the invention is applied may assume a structure in which the above oscillating current converter 110 is formed as a converter cell (generator cell), and the base thereof may be provided with a plurality of the converter cells. This makes it possible to obtain the oscillating current converter in an integrated form. Further, the plurality of converter cells may have the first and second oscillators 113A and 113B of which the lengths are successively differed to differ their natural frequencies. Therefore, the first and second oscillators 113A and 113B of any one of the plurality of converter cells can be resonated so as to efficiently oscillate while coping with a wide range of frequencies to efficiently convert the oscillation into an electric current (electric power). Accordingly, the oscillating current converter equipped with the plurality of the converter cells can produce a large electromotive force.

Twelfth Embodiment

Next, described below with reference to FIG. 19 is an oscillating current converter 120 according to a twelfth embodiment.

As shown in FIG. 19, the oscillating current converter 120 includes a base 121, an oscillator 124 attached to the surface of the base 121 via springs 122 and having an opening 123, a core 125 arranged on the surface of the base 121 so as to enter into the inside of the opening 123 of the oscillator 124, and a coil 126 wound around the core 125.

Among them, the base 121 is made from silicon of the shape of, for example, a rectangular flat plate. The springs 122 are coil springs having a length of about several tens of microns and spirally wound in the axial direction. The opening 123 is formed by a hole penetrating through the oscillator 124 nearly at the central portion thereof. The opening 123 in FIG. 19 is of a circular shape but is not necessarily limited to this shape only and may be, for example, of an elliptic shape or a rectangular shape.

The oscillator 124 includes a magnet which is obtained by, for example, dispersing a magnetic powder of samarium cobalt in a polydimethylsiloxane (PDMS) and is formed in an elongated shape being magnetized into N-pole and S-pole in the direction of thickness thereof. The oscillator 124 is arranged facing the main surface of the base 121, and is supported on both sides thereof by the pair of springs 122.

The core 125 is made from a ferromagnetic material such as the one obtained by solidifying an iron powder or the like or is an iron core, and is provided like a pole protruding upward from the main surface of the base 121 so as to enter into the inside of the opening 123 of the oscillator 124. The core 125 in FIG. 19 is of a pole-like shape but is not necessarily limited to this shape only and may be, for example, of the shape of a square pole if it is capable of entering into the inside of the opening 123.

The coil 126 is made from a wire such as of copper, and is spirally wound on the outer circumferential surface of the core 125. Though not shown, both ends of the coil are electrically connected to a power source circuit provided on the upper surface of the base 121. The power source circuit rectifies and smoothes an electric current flowing into the coil 126, and converts the alternating current into a direct current to output it.

In the oscillating current converter 120 having the above structure, the oscillator 124 inclusive of the magnet oscillates to generate an induced electromotive force in the coil 126 wound around the core 125. Concretely, in the oscillating current converter 120, the oscillator 124 attached to the surface of the base 121 via the springs 122 includes the magnet, and the coil 126 is wound around the core 125 so as to enter into the inside of the opening 123 of the oscillator 124. Therefore, the oscillator 124 oscillates maintaining a large amplitude. Besides, the oscillation attenuates slowly and the oscillator 124 continues to oscillate for an extended period of time.

Therefore, the distance the core 125 relatively moves in the axial direction undergoes a large change, the core 125 being capable of entering into the inside of the opening 123 of the oscillator 124, and the magnetic flux of the magnet piercing through the coil 126 wound around the core 125 undergoes a large change, too, making it possible to generate a large induced electromotive force in the coil 126 as well as to generate the induced electromotive force for an extended period of time. In particular, the oscillator 124 supported at both ends thereof on the surface of the base 121 via the pair of springs 122 exhibits more stable oscillation characteristics than those of the oscillators that are cantilevered, and features improved frequency.

According to the oscillating current converter 120 to which the invention is applied as described above, oscillation occurring on the oscillator 124 can be efficiently converted into an electric current (electric power). Moreover, upon arranging the coil 126 wound around the core 125 so as to enter into the inside of the opening 123, the size of the device can be decreased. According to the invention, therefore, the oscillating current converter 120 fabricated by using the MEMS technology features a further decreased size and improved conversion efficiency (generation efficiency).

Here, the oscillating current converter to which the invention is applied may assume a structure in which the above oscillating current converter 120 is formed as a converter cell (generator cell), and the base thereof is provided with a plurality of the converter cells. This makes it possible to obtain the oscillating current converter in an integrated form. Further, the plurality of converter cells may have the oscillators 124 of which the lengths are successively differed to differ their natural frequencies. Therefore, the oscillator 124 of any one of the plurality of converter cells can be resonated so as to efficiently oscillate while coping with a wide range of frequencies to efficiently convert the oscillation into an electric current (electric power). Accordingly, the oscillating current converter equipped with the plurality of the converter cells can produce a large electromotive force.

Other Embodiments

The invention is not necessarily limited to those of the above seventh to twelfth embodiments only but can be further varied in a scope without departing from the gist of the invention.

In the seventh to twelfth embodiments, for example, coil springs are used as the springs 72, 112A, 112B and 122. However, the invention is in no way limited to the constitution of using the above springs if the oscillators 73, 113A, 113B and 124 can be supported so as to oscillate.

Referring, for example, to an oscillating current converter 120A shown in FIG. 20, springs 127 formed by folding a wire such as of a metal are arranged instead of the springs 122 that constitute the above oscillating current converter 120. In this case, too, the oscillator 124 can be supported via the springs 127 so as to oscillate.

In the above seventh to twelfth embodiments, further, the oscillators 73, 113A, 113B and 124 are supported at the ends on one side thereof or on both sides thereof by the springs 72, 112A, 112B and 122 so as to oscillate. However, the oscillators 73, 113A, 133B and 124 may be supported at the central portions thereof by the springs so as to oscillate. Besides, the arrangement and the number of the springs may be suitably varied.

Further, the invention is not necessarily limited to the one in which the cantilevers or the oscillators have adjusted lengths to differ the natural frequencies of the cantilevers or the oscillators. Instead, the material or the weight of the cantilevers or the oscillators may be varied while forming the cantilevers or the oscillators in the same shape to differ their natural frequencies to cope with a wide range of frequencies.

According to the invention, further, constitutions disclosed by any of the above embodiments may be suitably combined together.

The oscillating current converter to which the invention is applied is not necessarily limited to the application of very small generator modules that convert oscillation into an electric current to obtain electric power but can be further applied to the sensors for detecting the oscillation by, for example, converting oscillation into an electric current.

DESCRIPTION OF THE REFERENCE NUMERALS AND SINGS

Figure 1:
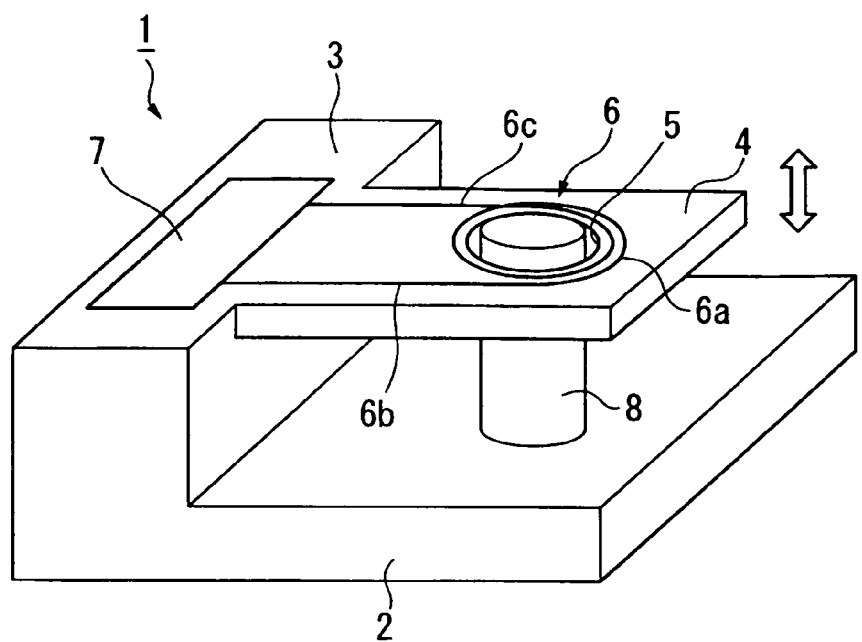
FIG. 1 is a perspective view of an oscillating current converter according to a first embodiment.
Figure 2:
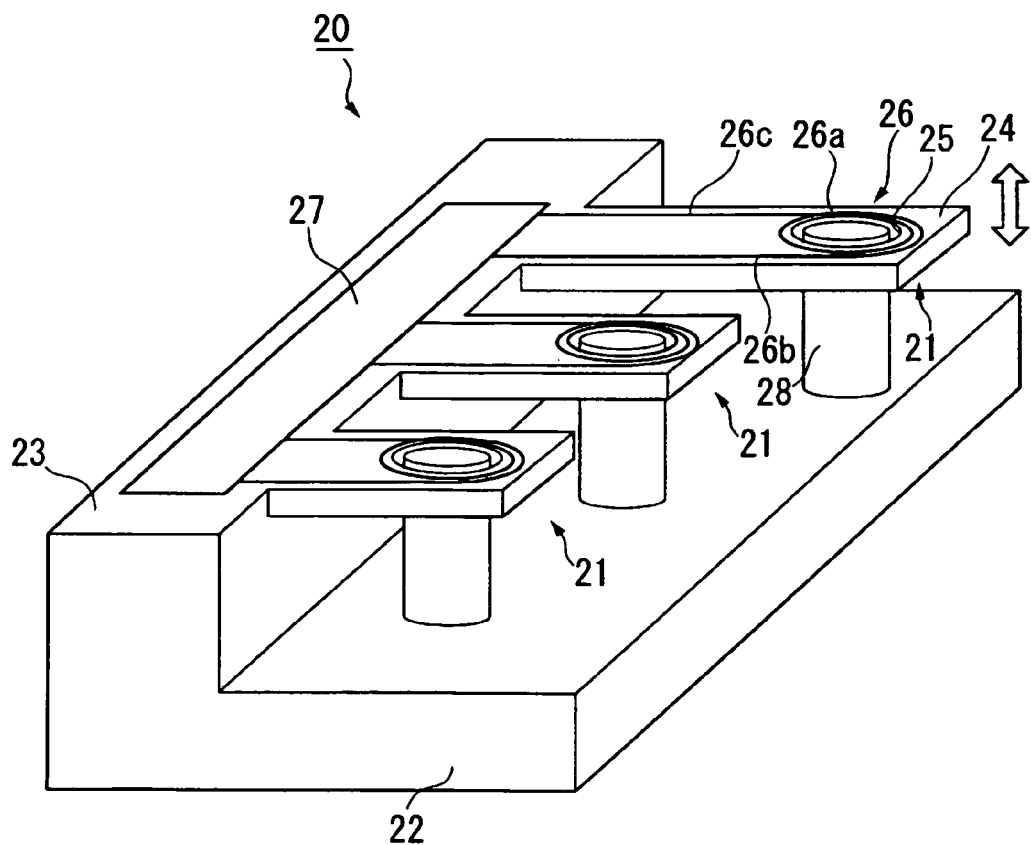
FIG. 2 is a perspective view of the oscillating current converter according to a second embodiment.
Figure 3:
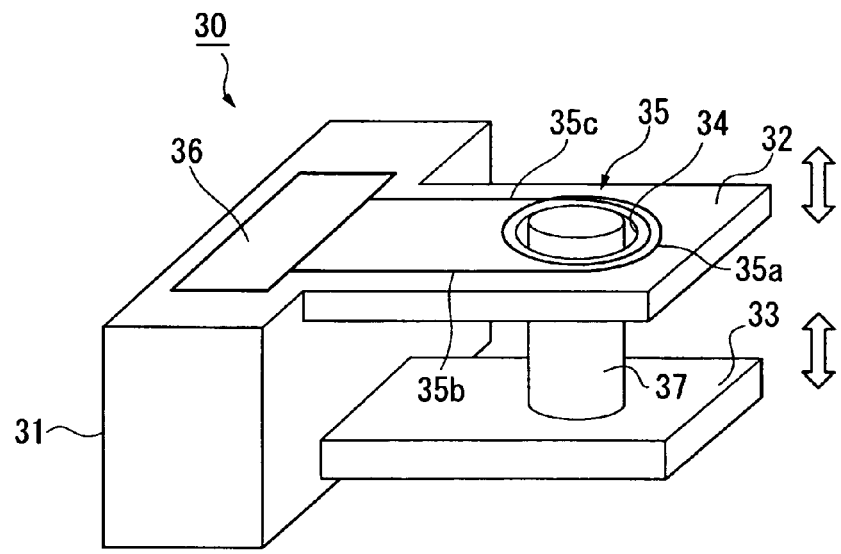
FIG. 3 is a perspective view of the oscillating current converter according to a third embodiment.
Figure 4:
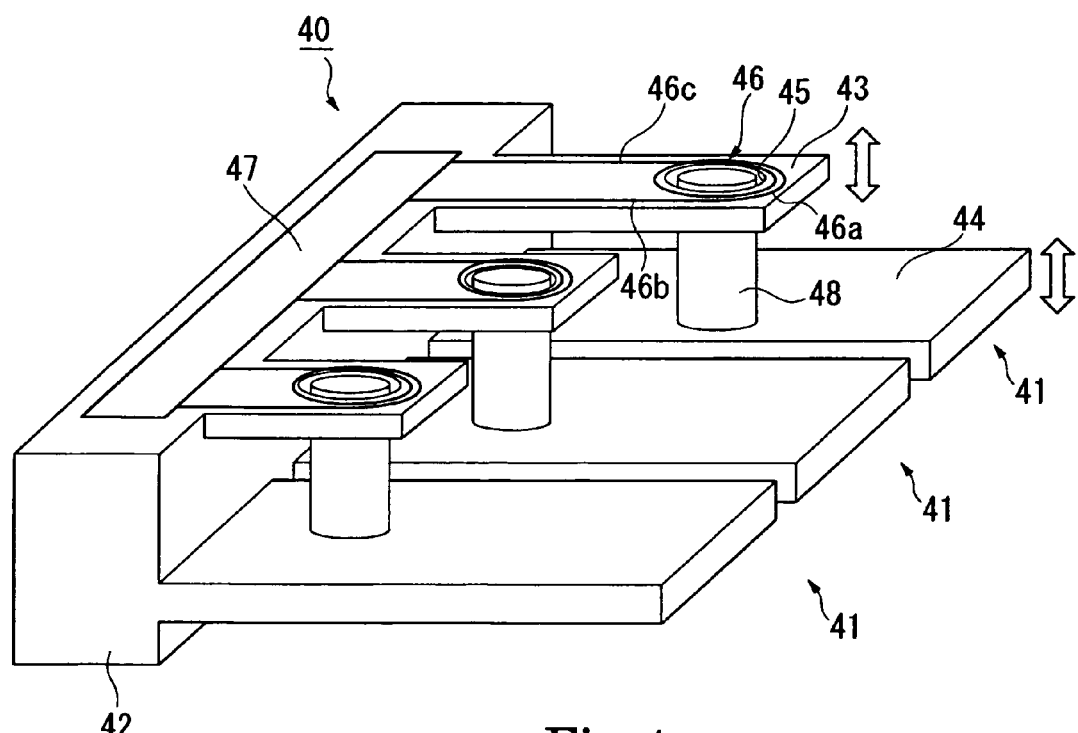
FIG. 4 is a perspective view of the oscillating current converter according to a fourth embodiment.
Figure 5:
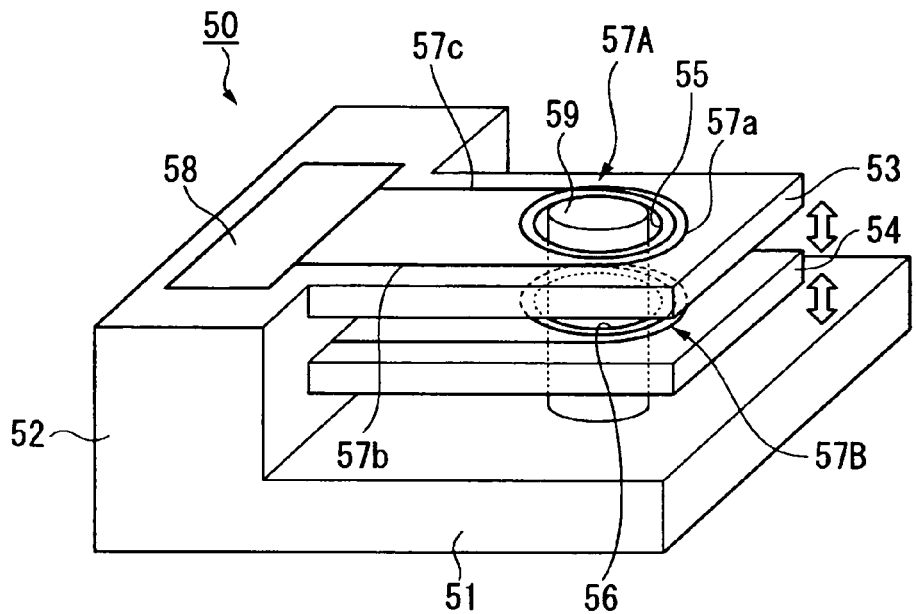
FIG. 5 is a perspective view of the oscillating current converter according to a fifth embodiment.
Figure 6:
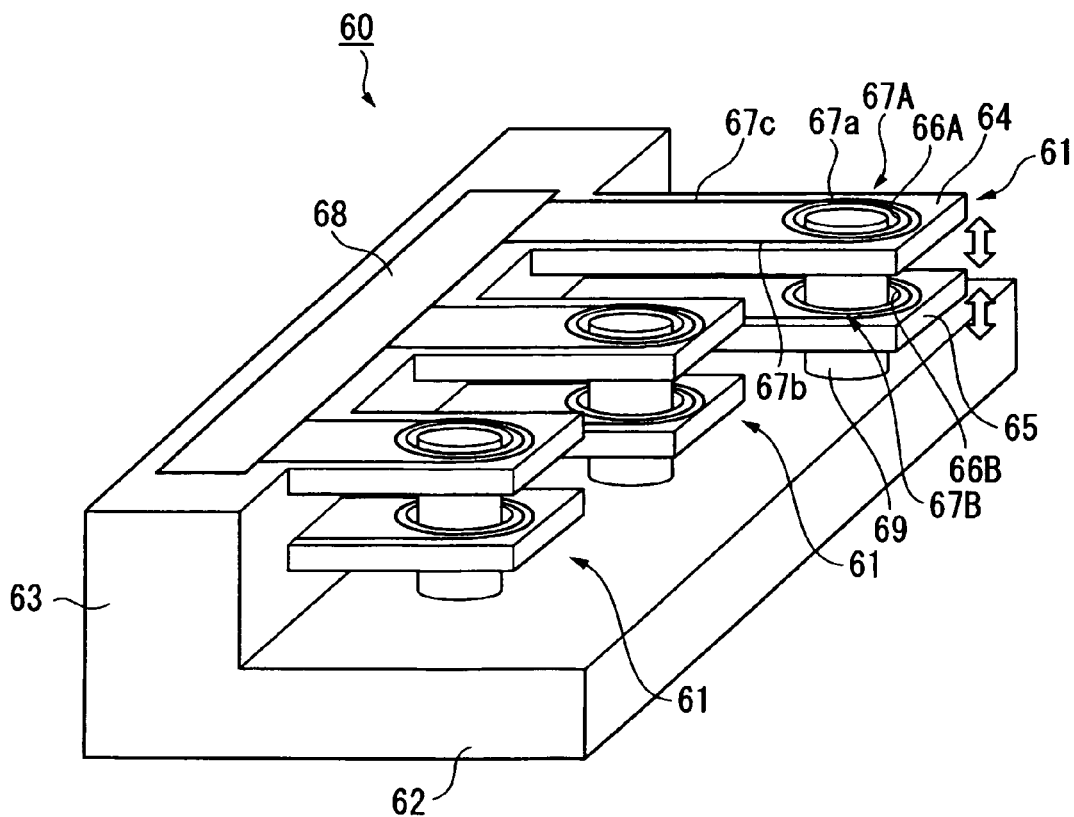
FIG. 6 is a perspective view of the oscillating current converter according to a sixth embodiment.
Figure 7:
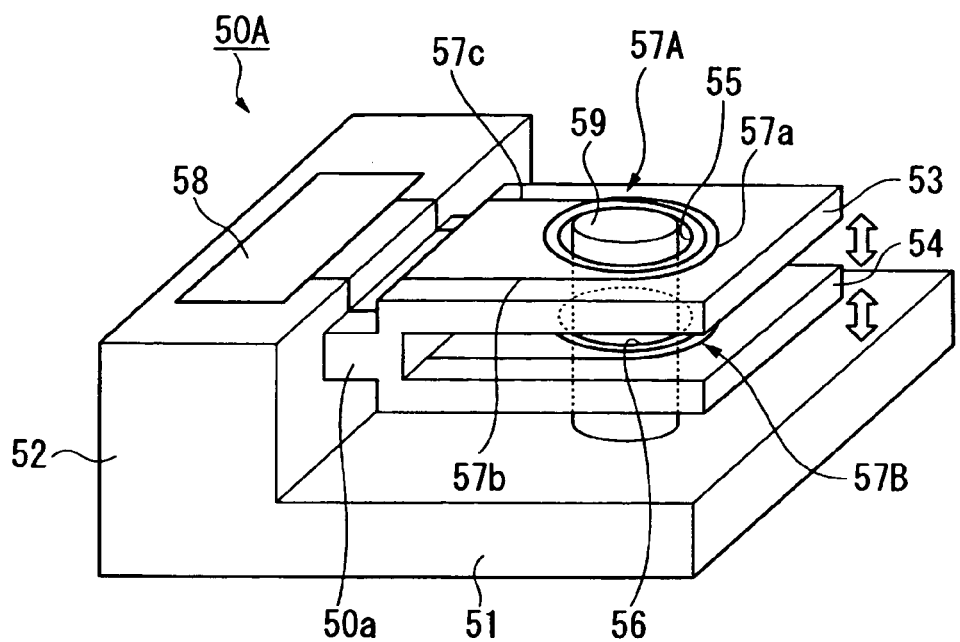
FIG. 7 is a perspective view of a modified example of the oscillating current converter to which the invention is applied.
Figure 8:
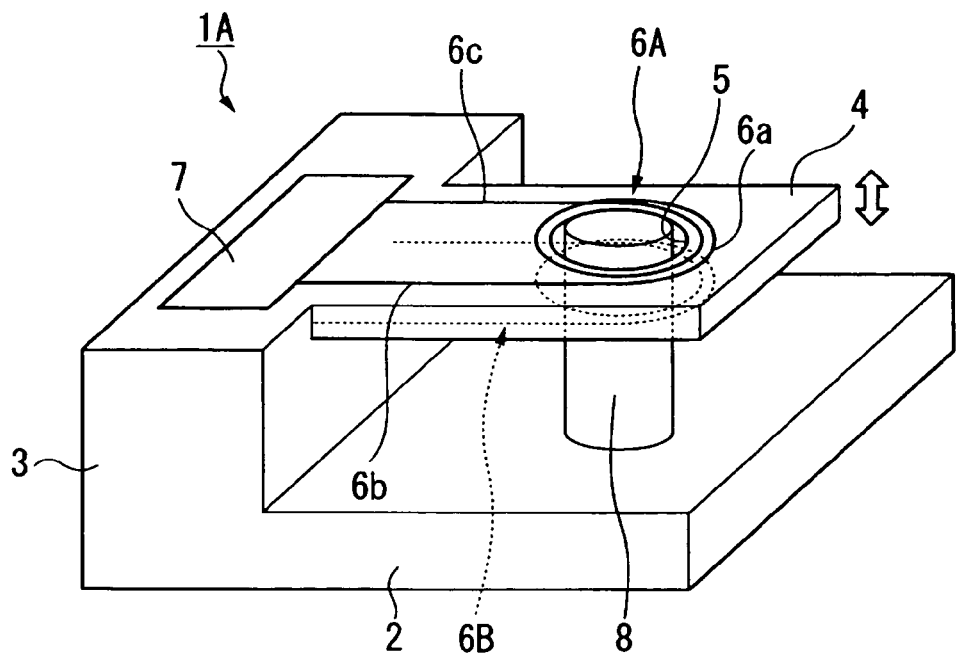
FIG. 8 is a perspective view of another modified example of the oscillating current converter to which the invention is applied.
Figure 9:
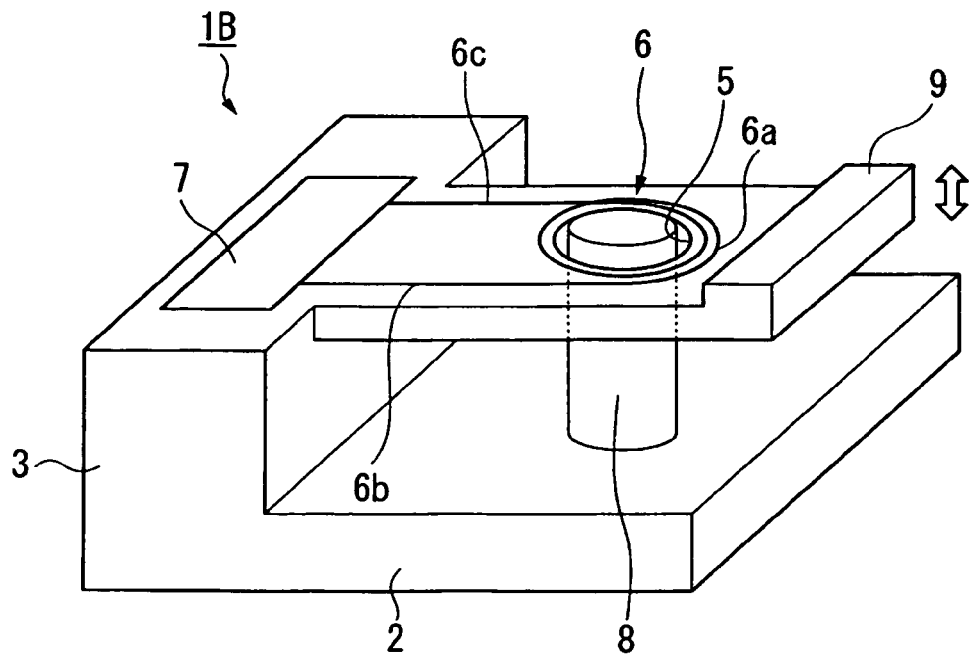
FIG. 9 is a perspective view of a further modified example of the oscillating current converter to which the invention is applied.
Figure 10:
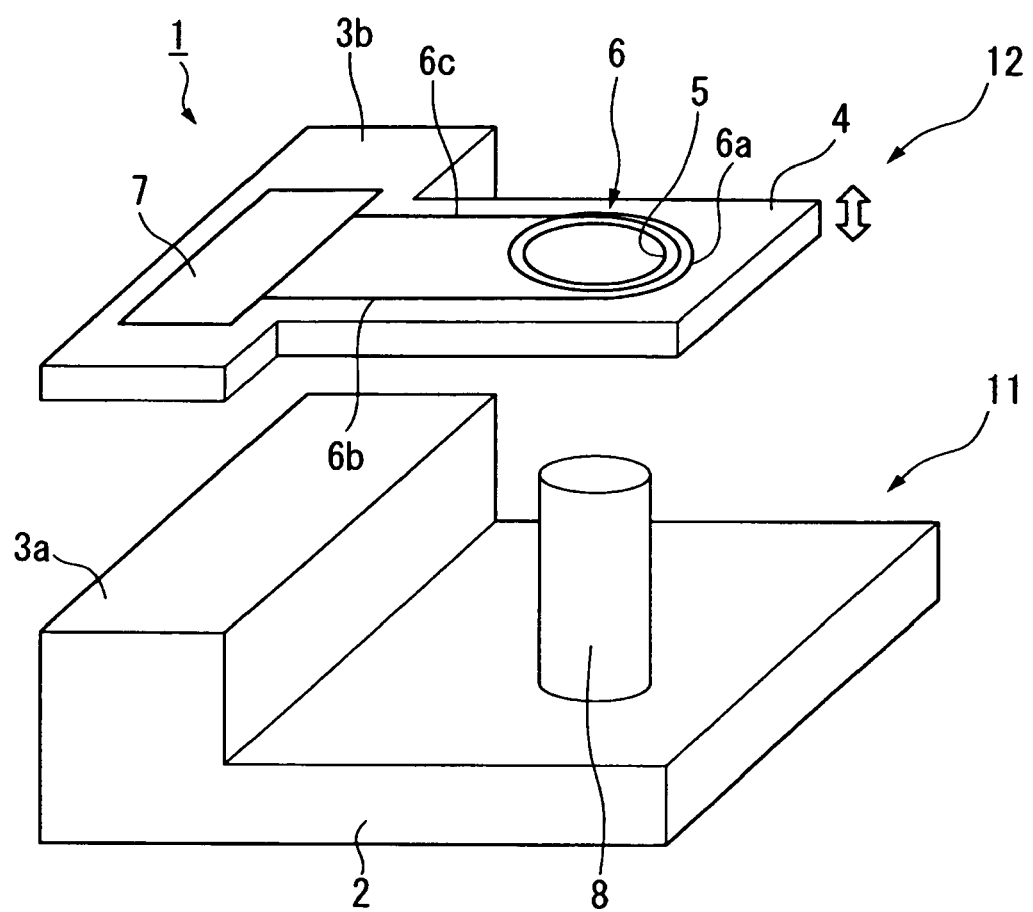
FIG. 10 is a disassembled perspective view of the oscillating current converter to which the invention is applied.
Figure 11A:
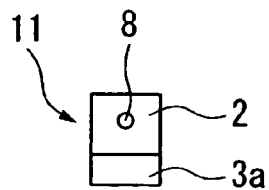
FIG. 11 is a view illustrating the steps for producing the oscillating current converter to which the invention is applied, wherein (a) is a plan view illustrating a lower substrate and (b) is a plan view illustrating a lower mother substrate.
Figure 11B:
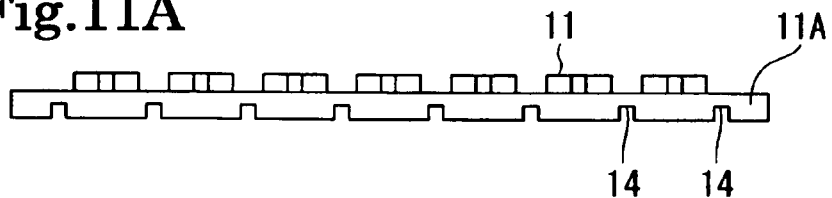
Figure 12A:
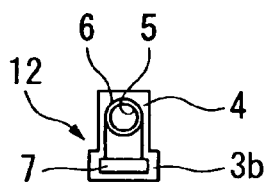
FIG. 12 is a view illustrating the steps for producing the oscillating current converter to which the invention is applied, wherein (a) is a plan view illustrating an upper substrate and (b) is a plan view illustrating an upper mother substrate.
Figure 12B:
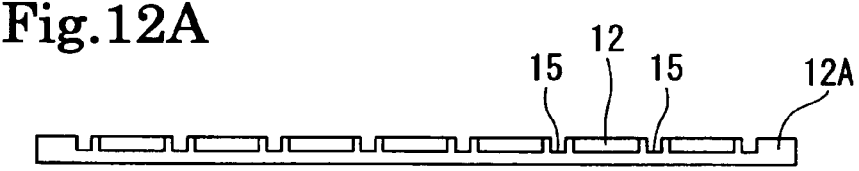
Figure 13A:
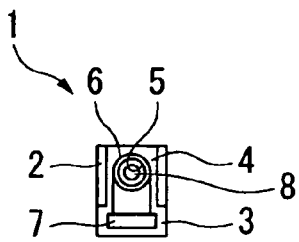
FIG. 13 is a view illustrating the steps for producing the oscillating current converter to which the invention is applied, wherein (a) is a plan view illustrating an oscillating current converter and (b) is a plan view illustrating a junction block.
Figure 13B:
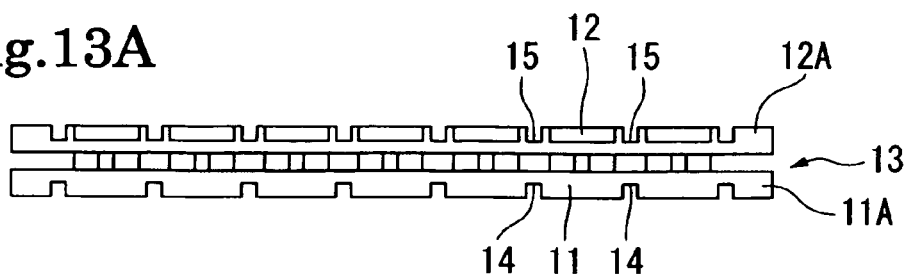
Figure 14:
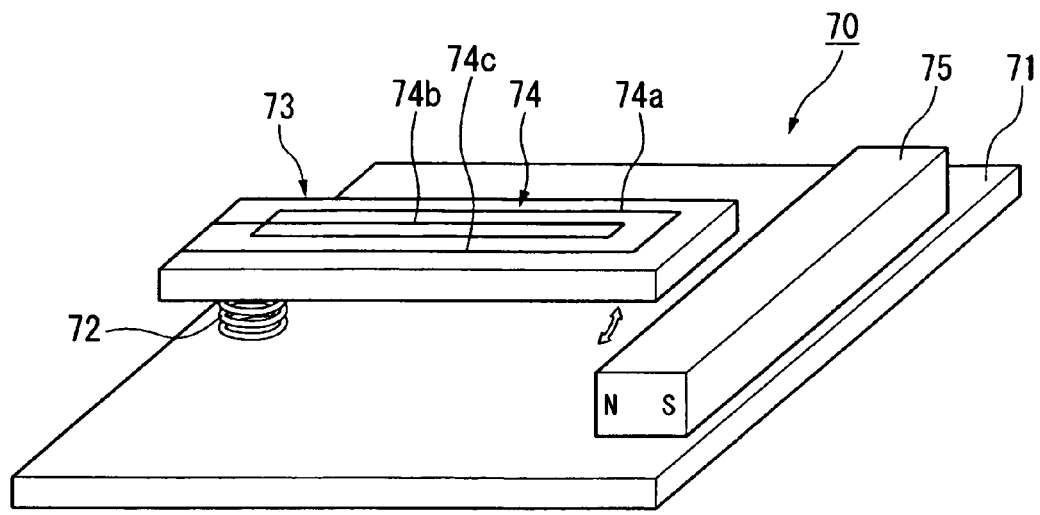
FIG. 14 is a perspective view of the oscillating current converter according to a seventh embodiment.
Figure 15:
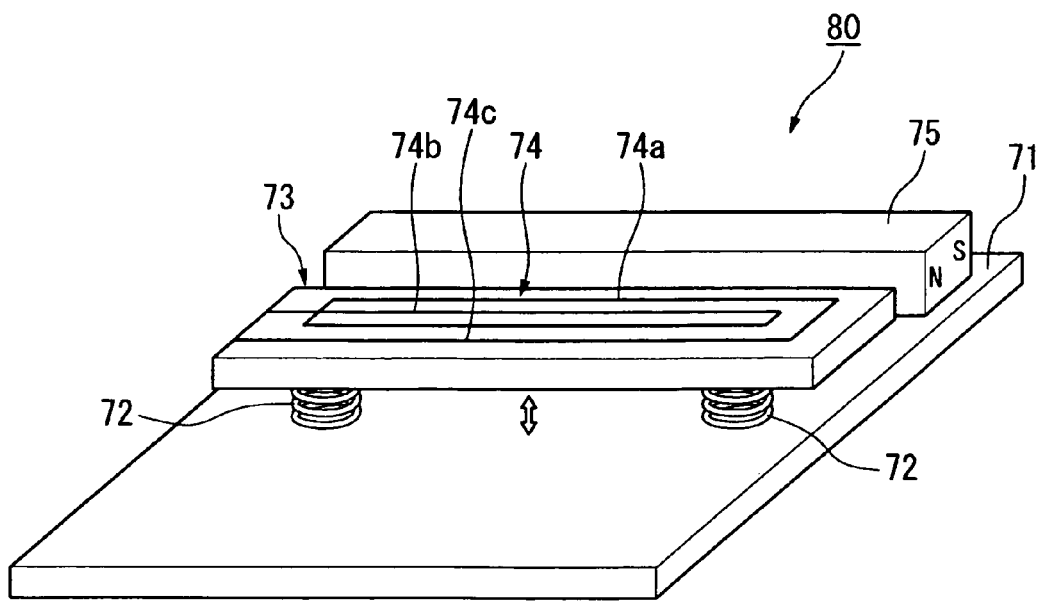
FIG. 15 is a perspective view of the oscillating current converter according to an eighth embodiment.
Figure 16:
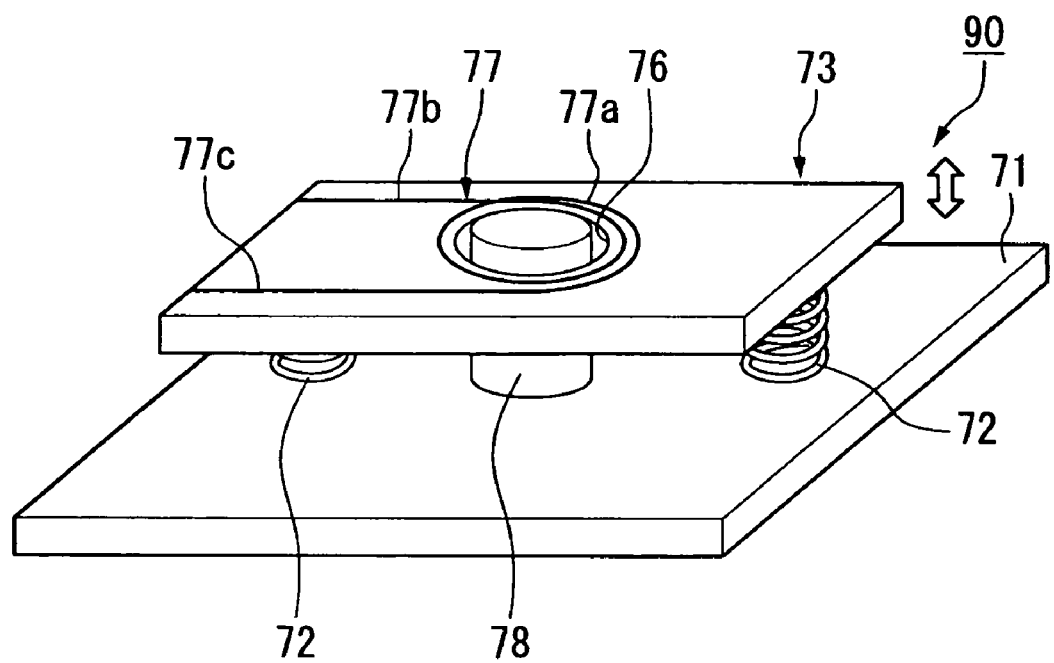
FIG. 16 is a perspective view of the oscillating current converter according to a ninth embodiment.
Figure 17:
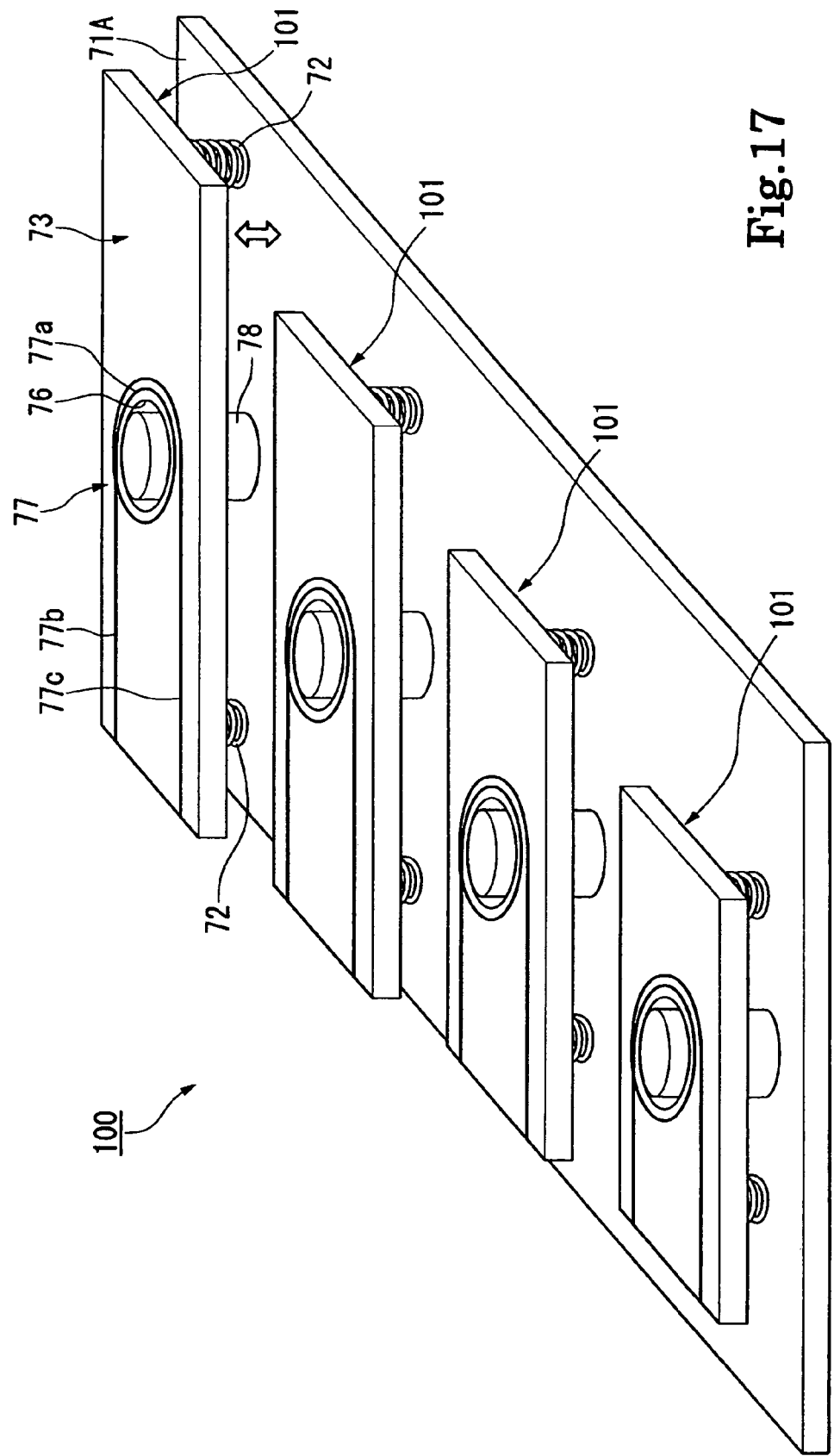
FIG. 17 is a perspective view of the oscillating current converter according to a tenth embodiment.
Figure 18:
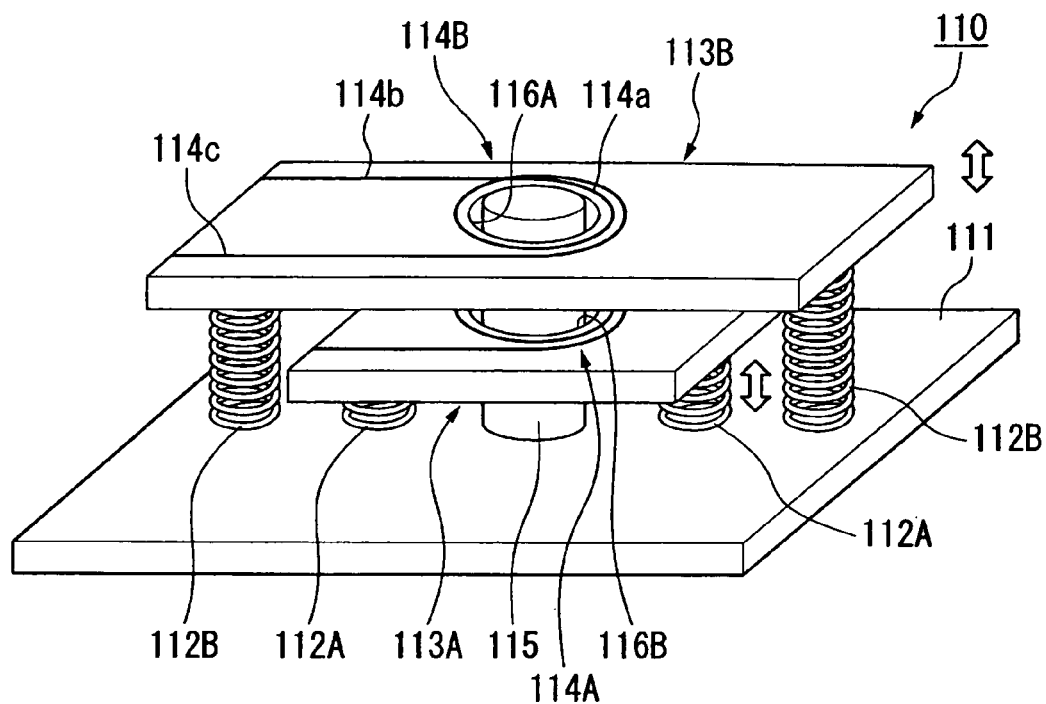
FIG. 18 is a perspective view of the oscillating current converter according to an eleventh embodiment.
Figure 19:
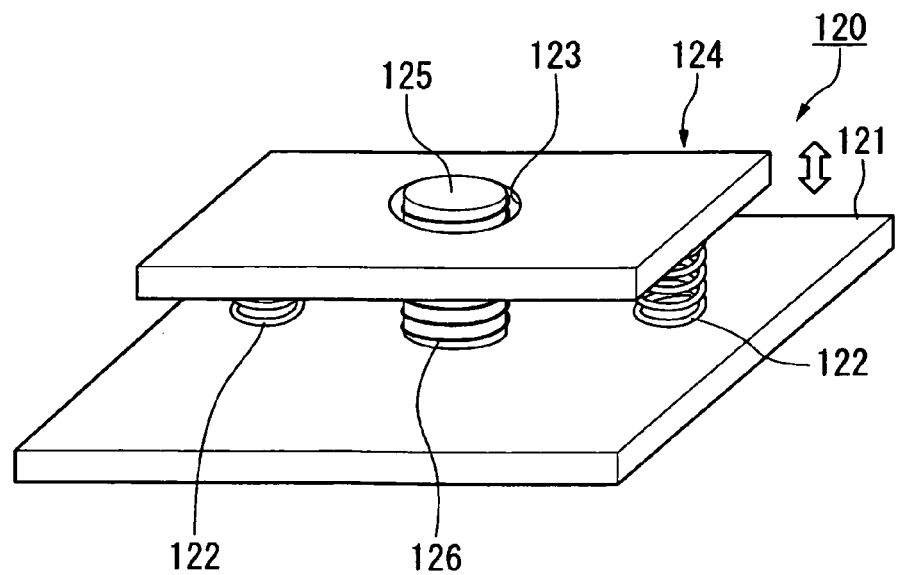
FIG. 19 is a perspective view of the oscillating current converter according to a twelfth embodiment.
Figure 20:
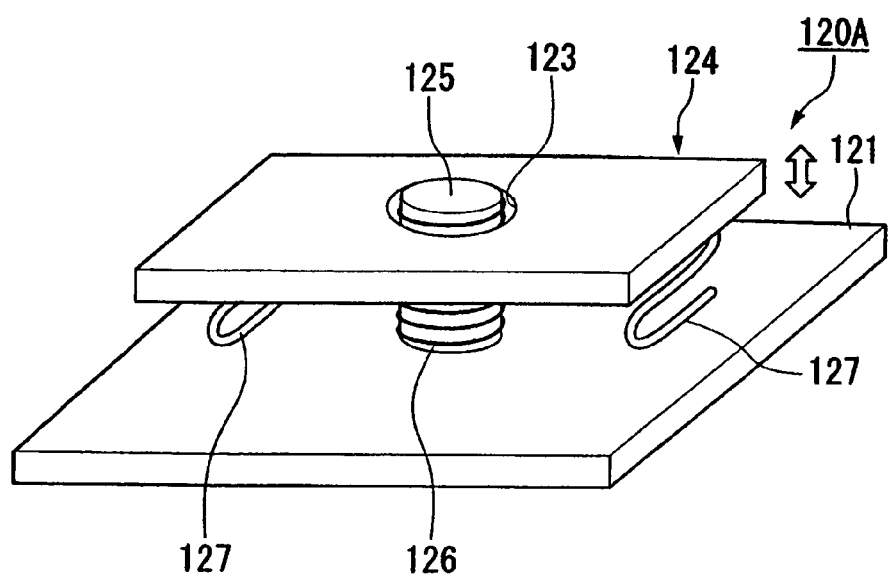
FIG. 20 is a perspective view of a modified example of the oscillating current converter to which the invention is applied.
Figure 21:
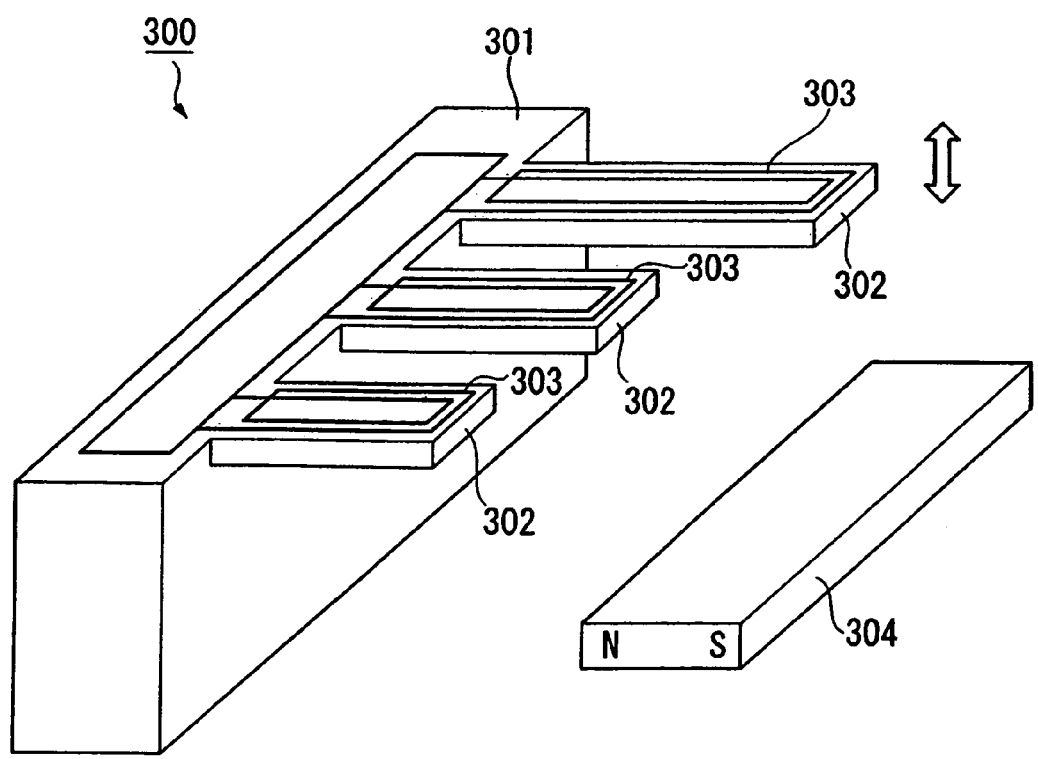
FIG. 21 is a perspective view of a conventional oscillating current converter.

1-oscillating current converter (first embodiment),
2-base,
3-support portion,
4-cantilever,
5-opening,
6-coil,
7-power source circuit,
8-magnet,
1A, 1B-oscillating current converters (modified examples),
9-weight,
11-lower substrate,
11A-lower mother substrate,
12-upper substrate,
12A-upper mother substrate,
13-junction block,
14, 15-grooves,
20-oscillating current converter (second embodiment),
21-converter cells,
22-base,
23-support portion,
24-cantilevers,
25-openings,
26-coils,
27-power source circuit, 28-magnets,
30-oscillating current converter (third embodiment),
31-support portion,
32-first cantilever,
33-second cantilever,
34-opening,
35-coil,
36-power source circuit,
37-magnet,
40-oscillating current converter (fourth embodiment),
41-converter cells,
42-support portion,
43-first cantilevers,
44-second cantilevers,
45-openings,
46-coils,
47-power source circuit,
48-magnets,
50-oscillating current converter (fifth embodiment),
51-base,
52-support portion,
53-first cantilever,
54-second cantilever,
55, 56-openings,
57A-first coil,
57B-second coil,
58-power source circuit,
59- magnet,
50A-oscillating current converter (modified example),
50a-coupling portion,
60-oscillating current converter (sixth embodiment),
61-converter cells,
62-base,
63-support portion,
64-first cantilevers,
65-second cantilevers,
66A, 66B-openings,
67A-first coils,
67B-second coils,
68-power source circuit,
69-magnets,
70-oscillating current converter (seventh embodiment),
71, 71A-bases,
72-spring,
73-oscillator,
74-coil,
75-magnet,
76-opening,
77-coil,
80-oscillating current converter (eighth embodiment),
90-oscillating current converter (ninth embodiment),
100-oscillating current converter (tenth embodiment),
101-converter cells,
110-oscillating current converter (eleventh embodiment),
111-base,
112A, 112B-springs,
113A-first oscillator,
113B-second oscillator,
114A-first coil,
114B-second coil,
115-magnet,
120-oscillating current converter (twelfth embodiment),
121-base,
122-springs,
123-opening,
124-oscillator,
125-core,
126-coil,
127-springs

The invention claimed is:

1. An oscillating current converter fabricated using MEMS technology, the oscillating current converter comprising:
a cantilever having a distal end side, a proximal end side, and an opening formed on the distal end side, the cantilever being cantilevered on the proximal end side for undergoing oscillating movement;
a coil wound around the opening of the cantilever; and
a magnet arranged so as to enter into the inside of the opening of the cantilever;
wherein oscillating movement of the cantilever causes relative movement between the magnet and the coil that results in a variation of a magnetic flux of the magnet that generates an induced electromotive force in the coil.

2. An oscillating current converter according to claim 1; wherein the coils are arranged on both surfaces of the cantilever.

3. An oscillating current converter according to claim 1; wherein a weight is arranged on the distal end side of the cantilever.

4. An oscillating current converter fabricated using MEMS technology, the oscillating current converter comprising:
a first cantilever having a distal end side, a proximal end side, and an opening formed on the distal end side, the cantilever being cantilevered on the proximal end side for undergoing oscillating movement;
a second cantilever arranged in confronting relation to the first cantilever and being cantilevered on a proximal end side of the second cantilever for undergoing oscillating movement;
a coil wound around the opening of the first cantilever; and
a magnet provided on a distal end side of the second cantilever so as to enter into the inside of the opening of the first cantilever;
wherein oscillating movement of at least one or both of the first cantilever and the second cantilever causes relative movement between the magnet and the coil that results in a variation of a magnetic flux of the magnet that generates an induced electromotive force in the coil.

5. An oscillating current converter according to claim 4; wherein the first cantilever and the second cantilever are arranged in the same direction in confronting and parallel relation to each other, and are formed integrally with a support portion that cantilevers the proximal end sides thereof.

6. An oscillating current converter according to claim 4; wherein the first cantilever and the second cantilever are arranged in the same direction in confronting and parallel relation to each other, and are formed integrally with a support portion via a coupling portion that couples the proximal end sides thereof.

7. An oscillating current converter fabricated using MEMS technology, the oscillating current converter comprising:
a first cantilever having a distal end side, a proximal end side, and an opening formed on the distal end side, the cantilever being cantilevered on the proximal end side for undergoing oscillating movement;
a second cantilever arranged in confronting relation to the first cantilever, the second cantilever having a distal end side, a proximal end side, and an opening formed on the distal end side and being cantilevered on the proximal end side thereof;
a first coil wound around the opening of the first cantilever;

a second coil wound around the opening of the second cantilever; and a magnet arranged so as to enter into the inside of the openings of the first and second cantilevers;

wherein oscillating movement of the first and second cantilevers causes relative movement between the magnet and the coil that results in a variation of a magnetic flux of the magnet that generates induced electromotive forces in the first and second coils.

8. An oscillating current converter fabricated using MEMS technology, the oscillating current converter comprising:

a plurality of converter cells arranged at a predetermined distance from each other, each of the converter cells having a cantilever having an opening at a distal end side and cantilevered on a proximal end side for undergoing oscillating movement, a coil wound around the opening of the cantilever, and a magnet arranged so as to enter into the inside of the opening of the cantilever;

wherein for each of the converter cells oscillating movement of the cantilever causes relative movement between the magnet and the coil that results in a variation of a magnetic flux of the magnet that generates an induced electromotive force in the coil.

9. An oscillating current converter according to claim 8; wherein the cantilevers of the plurality of converter cells are arranged in the same direction in confronting and parallel relation to each other, and are formed integrally with a support portion that cantilevers the proximal end sides thereof.

10. An oscillating current converter according to claim 8; wherein the plurality of converter cells have different natural frequencies.

11. An oscillating current converter fabricated using MEMS technology, the oscillating current converter comprising:

a plurality of converter cells arranged at a predetermined distance from each other, each of the converter cells comprising a first cantilever having an opening at a distal end side acid cantilevered on a proximal end side for undergoing oscillating movement, a second cantilever arranged in confronting relation to the first cantilever and being cantilevered on a proximal end side of the second cantilever for undergoing oscillating movement, a coil wound around the opening of the first cantilever, and a magnet provided on the distal end side of the second cantilever so as to enter into the inside of the opening of the first cantilever;

wherein oscillating movement of least one or both of the first cantilever and the second cantilever causes relative movement between the magnet and the coil that results in a variation of a magnetic flux of the magnet that generates an induced electromotive force in the coil.

12. An oscillating current converter fabricated using MEMS technology, the oscillating current converter comprising:

a plurality of converter cells arranged at a predetermined distance from one another, each of the converter cells comprising a first cantilever having an opening at a distal end side and cantilevered on a proximal end side for undergoing oscillating movement, a second cantilever arranged in confronting relation to the first cantilever and having an opening at a distal end side of the second cantilever and being cantilevered on a proximal end side of the second cantilever for undergoing oscillating movement, a first coil wound around the opening of the first cantilever, a second coil wound around, the enter into the inside of the openings of the first and second cantilevers;

wherein oscillating movement of the first and second cantilevers causes relative movement between the magnet and the coil that results in a variation of a magnetic flux of the magnet that generates induced electromotive forces in the first and second coils.

\* \* \* \* \*